United States Patent
Clauss et al.

(10) Patent No.: US 11,405,379 B1
(45) Date of Patent: Aug. 2, 2022

(54) MULTI-FACTOR MESSAGE-BASED AUTHENTICATION FOR NETWORK RESOURCES

(71) Applicant: Amazon Technologies, Inc., Seattle, WA (US)

(72) Inventors: Bryan Clauss, Washington, DC (US); Arun Donti, Herndon, VA (US); Brandon Lee Harvey, Grand Prairie, TX (US)

(73) Assignee: Amazon Technologies, Inc., Seattle, WA (US)

( * ) Notice: Subject to any disclaimer, the term of this patent is extended or adjusted under 35 U.S.C. 154(b) by 215 days.

(21) Appl. No.: 16/802,006

(22) Filed: Feb. 26, 2020

(51) Int. Cl.
*H04L 9/40* (2022.01)
*H04W 4/12* (2009.01)
*H04W 12/069* (2021.01)
*H04W 12/0431* (2021.01)

(52) U.S. Cl.
CPC ........ *H04L 63/0823* (2013.01); *H04L 63/083* (2013.01); *H04W 4/12* (2013.01); *H04W 12/0431* (2021.01); *H04W 12/069* (2021.01); *H04L 2463/082* (2013.01); *H04L 2463/121* (2013.01)

(58) Field of Classification Search
None
See application file for complete search history.

(56) References Cited

U.S. PATENT DOCUMENTS

| | | | | |
|---|---|---|---|---|
| 10,715,327 B1 * | 7/2020 | Ramanujan | ......... | H04L 63/0838 |
| 10,721,311 B1 * | 7/2020 | McDonald | ............ | H04L 67/146 |
| 11,044,257 B1 * | 6/2021 | Heuts | .................. | G06F 21/6209 |
| 11,140,169 B1 * | 10/2021 | Hamel | .................. | H04L 63/102 |
| 11,151,660 B1 * | 10/2021 | Harding | .................... | G06F 7/14 |
| 2013/0332544 A1 * | 12/2013 | Brian | ..................... | H04L 51/04 709/206 |
| 2014/0259135 A1 * | 9/2014 | Postrel | ................ | H04L 63/0807 726/7 |
| 2015/0295930 A1 * | 10/2015 | Dixon | ................. | H04L 63/0876 713/181 |
| 2016/0173518 A1 * | 6/2016 | Roth | ....................... | G06F 21/45 726/23 |
| 2016/0182479 A1 * | 6/2016 | Kaplan | ................... | H04L 63/08 726/6 |

(Continued)

OTHER PUBLICATIONS

Christophgysin et al., "Serverless MFA API", github readme file, Jan. 2, 2019, <https://github.com/silinternational/serverless-mfa-api/blob/fb0e7dbf6f49c8540211912197d54b086262f251/README.md> 9 total pages. (Year: 2019).*

*Primary Examiner* — Michael Pyzocha
(74) *Attorney, Agent, or Firm* — Lee & Hayes, P.C.

(57) ABSTRACT

An authentication process that provides secure and verified access to content, such as content presented on websites. At a first instance, users may be validated using a first token, at a second instance, users may be validated or authorized using the first token and an email address, and at a third instance, users may be validated or authorized using the first token, the email address, and the second token. Therein users are authenticated and provided access to the websites. During the authentication process and the during separate instances (or times), if the multiple token(s) are invalid and/or the email address is associated with an unauthorized user, access to the website may be denied.

20 Claims, 9 Drawing Sheets

(56) References Cited

U.S. PATENT DOCUMENTS

| | | | |
|---|---|---|---|
| 2018/0337784 A1* | 11/2018 | Jain | H04L 9/3213 |
| 2019/0197231 A1* | 6/2019 | Meier | H04L 63/0407 |
| 2019/0334884 A1* | 10/2019 | Ross | G06F 21/41 |
| 2019/0386981 A1* | 12/2019 | Ramesh Kumar | H04L 63/0853 |
| 2020/0106762 A1* | 4/2020 | VanBlon | H04L 63/0846 |
| 2020/0228611 A1* | 7/2020 | McDonald | H04L 67/142 |
| 2020/0250664 A1* | 8/2020 | Kumar | G06Q 20/385 |
| 2020/0412538 A1* | 12/2020 | Rosado | H04L 63/062 |
| 2021/0051012 A1* | 2/2021 | Law | G06Q 20/4014 |
| 2021/0084032 A1* | 3/2021 | Ding | G06F 9/54 |
| 2021/0105264 A1* | 4/2021 | Patel | H04L 9/0825 |
| 2021/0377252 A1* | 12/2021 | Monro | H04L 63/0807 |

\* cited by examiner

MULTI-FACTOR MESSAGE-BASED AUTHENTICATION FOR NETWORK RESOURCES

BACKGROUND

Computer networks facilitate the transmission and exchange of content. Using a computer, users may gain access to the content on a website, or other online resources, for example. However, unregulated access to content poses an inherent risk and security concerns. Websites or other online resources may therefore utilize user authentication as a way to limit access to content.

User authentication typically requires users to register identification information using a username and associated password. This form of authentication is typically referred to as one-factor authentication, and occasionally, users may be required to provide more than one form of authentication, typically referred to as multi-factor authentication. Unfortunately, traditional authentication methods have various flaws and are prone to hackers or others attempting to gain unauthorized access. Further technical improvements may reduce unauthorized access, increase security, and/or prevent dissemination of protected information.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

DETAILED DESCRIPTION

Figure 1:
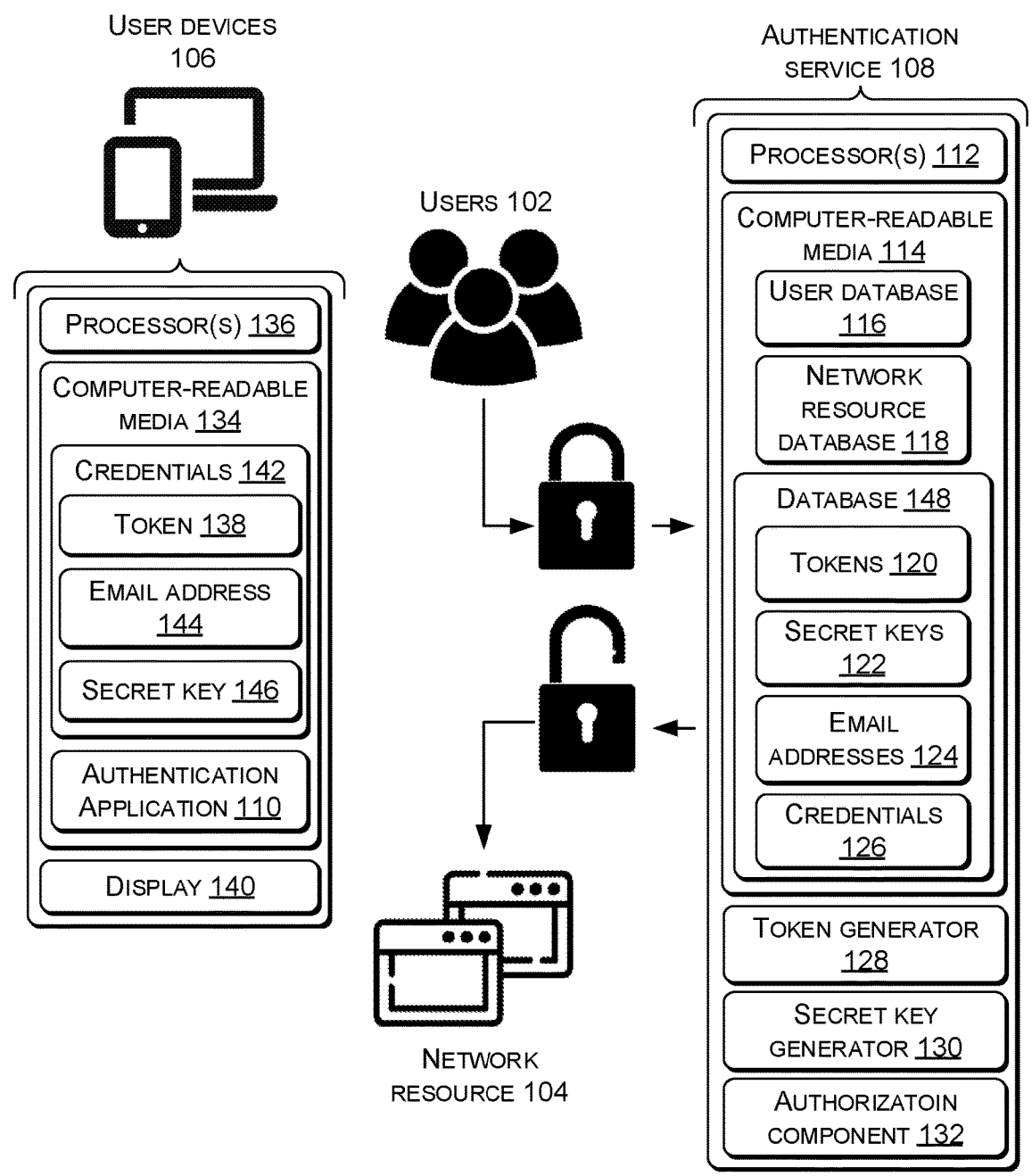
FIG. 1 illustrates an example environment for authenticating a user accessing a network resource, according to an embodiment of the present disclosure.

The unfettered access to content poses inherent risks and security concerns in the digital world. Websites, networks, or other resources may therefore require user authentication to limit access. Traditional authentication methods are prone to hackers or others attempting to gain unpermitted access. For example, credentials of an authorized user may be stolen and utilized to gain access to protected information. Current techniques are therefore susceptible to providing inadvertent access to unauthorized users.

Discussed herein, among other things, are systems and methods for authenticating users to provide secure access to networks, workspaces, resources (e.g., desktop(s)), and/or network resources (e.g., mobile applications, websites, etc.). In some instances, the systems and methods discussed herein may include an authentication service that authenticates or otherwise verifies users using one or more credential(s). The authentication service may include an authentication application that operates on a user device and that communicates with the authentication service for verifying the user, confirming the identity of the user, and/or otherwise authenticating the user. As the user submits a request to visit a network resource (e.g., website), for example, the authentication application may receive the request and require authentication before providing access. In this sense, the authentication service, including the authentication application, may act as a gateway that limits access to the network resource and verifies the identity of the user before providing access. After authentication, the user may be allowed to access the network resource and perform various operations within the network resource (e.g., post, edit, etc.). In some instances, after authentication, the user may be further authorized for performing operations within and/or on the network resource. In some instances, the authentication service may be added as a service or used as a feature for pre-existing network resource(s), networks, or computer architectures for increasing security, protecting access to various forms of content, and maintaining privacy of data.

To illustrate, envision that a user navigates to a network resource, such as a webpage or website, using a browser application. In some instances, the website may be a serverless website that is hosted by a third-party (or network service provider providing access to the network resource or hosing the network resource). The authentication application operating on a user device of the user, or within the browser, may receive or otherwise determine that the user is attempting to gain access to the website. Upon receiving the request or making this determination, the authentication application may determine whether the user has a valid token associated with accessing the website. The token may be a unique set of identifiers, an encrypted key, or a string of characters generated by the authentication service for verifying the user or providing the user with access to the website. In some instances, to determine whether the user has the token, the authentication application may access memory of the user device, or the browser application. If the user has a token, the authentication application may transmit, at a first instance (or time), the token to the authentication service for verification, as discussed herein.

Alternatively, if no token is found, the authentication application may transmit a request for a token to the authentication service. In such instances, the authentication service may generate a token and provide the generated token back to the authentication application. Upon receiving the token from the authentication service, the authentication program may store the token in memory of the user device. Thereafter, the authentication application may transmit the newly generated token back to the authentication service for verification.

Noted above, once the user receives the token from the authentication service, or if the user has a previously stored token, the authentication application may cause the user device to transmit the token to the authentication service for verification and/or validation. The authentication service may compare the token with a database of tokens to determine whether the token provided by the user is invalid and/or has expired. For example, as part of generating the token, the authentication service may maintain a database of valid, or generated, tokens. Additionally, the tokens may be associated with respective time thresholds, or an amount of time the tokens are valid. Upon receiving the token, the authentication service may compare a time stamp associated with the generation of the token (or a time the token was provided to the user) to determine whether the token is valid and or has expired. If the token is invalid or has expired, the authentication service may transmit an indication to the authentication application (or the user device) to deny the user access to the website. Herein, in instances where the token is invalid or has expired, the authentication application may request a new token from the authentication service.

After determining that the user has a valid token, the authentication service may transmit an indication of such to the user device (or the authentication application). The authentication service may also transmit a request to the authentication application for prompting the user to enter an email address. In this sense, after the token is validated, the authentication service may then request the email address of the user. The authentication application may then request or prompt the user to enter an email address for communicating with the user. In some instances, other identifiers associated with the user may be requested of the user for authenticating the user (e.g., social security number (SSN), chat ID, username, etc.) and/or for communicating with the user and/or authenticating the user (e.g., SMS, text message, etc.). Generally, the identifiers may be utilized to determine whether the user (or client) associated with the identifier is authorized, permitted, or allowed to access the website.

Upon receiving the request, the authentication application may cause a modal, dialogue box, interface, or window to be displayed on the user device that requests or otherwise prompts the user to provide his or her email address. The authentication application may then cause the user device to transmit the email address to the authentication service. The authentication application may also provide, as part of authenticating the user at a second instance (or time), the token to the authentication service. As such, at the second instance (or time), the authentication service may receive, from the user device, the token and the email address of the user.

Upon receipt, the authentication service may determine whether the email address is associated with a user permitted or authorized to access the website. For example, the authentication service may maintain a database of permitted users who are authorized to access the website. In one instance, the authentication service may compare the email address of the user, or portions thereof (e.g., domain), for determining whether the user is permitted to access the website. For example, only email addresses having a certain domain may be permitted to access the website. In other instances, the authentication service may compare other identifiers associated with the user to determine whether the user is permitted to access the web site (e.g., phone number, SSN, location, GPS coordinates, title, employer ID, etc.). Additionally, the authentication service may again determine whether the token is valid. That is, at the second instance (or time), the authentication service may determine that the email address is still valid (e.g., not expired). If the authentication service determines that the email address is associated with an unauthorized user (e.g., the user is not recognized or not permitted to access the website) or that the token is invalid, the authentication service may deny access to the website and the authentication application operating on the user device may cause access to the website to be denied.

Alternatively, if the email address is authorized and if the token is valid, the authentication service may associate the token and the email address with one another. Associating the token and the email address may further enhance security and/or reduce access to the website by unauthorized users. The authentication service may also generate an additional token or secret key for further authenticating the user. The secret key may be a unique set of identifiers, an encrypted key, or a string of characters generated by the authentication service for authenticating the user. The secret key generated by the authentication service may be associated with the token and/or the email address of the user for use at later instances. After generating the secret key, the authentication service may transmit the secret key to the email address of the user. In some instances, other forms of communication may be used to transmit the secret key to the user (e.g., text, SMS, a mobile application, etc.). Regardless of the specific form of delivery, the user may obtain the secret key via accessing the email of the user, for example. In the meantime, the authentication application may cause a window to be displayed on the user device requesting that the user enter the secret key provided to his or her email address. After the user enters the secret key into the window, the authentication application may cause the user device to transmit the token, the email address, and the secret key to the authentication service. In other words, at a third instance (or time), the authentication service may receive the token, the email address, and the secret key from the user device.

The authentication service may therein utilize the token, the email address, and the secret key to authenticate the user. For example, the authentication service may determine whether the token is valid, whether the email address is authorized, and whether the secret key is valid. If the authentication service determines that the token is invalid (e.g., expired), that the email address is not authorized (e.g., unauthorized user), or that the secret key is invalid (e.g., expired), the authentication service may deny access to the website. In such instances, the authentication application operating on the user device may deny access to the website. As noted above, if the token is invalid, in some instances, a new token may be requested from the authentication service. Additionally, or alternatively, if the secret key is invalid, a new secret key may be generated and transmitted to the email address of the user. For example, as part of generating the secret key, the authentication service may maintain a database of valid, or generated, secret keys. The secret key may also be associated with respective time thresholds, or an amount of time the secret key is valid. Upon receiving the secret key, the authentication service may compare a time stamp associated with the generation of the secret key to determine whether the secret key is valid or has expired. In instances where the secret key is invalid or has expired, the authentication service may transmit an indication to the authentication application denying the user access to the website.

In instances where the secret key is invalid or expired, for example, the authentication application may prompt the user to enter his or her email address within a window. Therein, the authentication service may generate a new secret key and transmit the secret key to the email address of the user. As part of this process, the authentication service may also determine whether the email address is associated with an authorized user, or a user allowed to access the website. After the user enters the new secret key, the authentication application may provide the token (or the new token), the email address, and the new secret to the authentication service. The authentication service may then attempt to authenticate the user using the token (or the new token), the email address, and the new secret key.

If the authentication service determines that the token is valid, the email address is authorized, and the secret key is valid, the authentication service may determine that the user is authenticated. The process of authenticating the user may confirm or verify an identity of the user attempting to access the website. After authentication, the authentication service may transmit an indication of such to the authentication application and the authentication application may allow access to the website or cause the website to be displayed on the user device. In such instances, the authentication application operating on the user device, or within the browser, may remove the window or otherwise cause the window to disappear, which may cause the website to be displayed on the user device. After the user has access to the website, the user may modify content within website, generate posts on the website, or otherwise interact with the website. However, in some instances, after being authenticated, the user may still be required to be authorized to perform actions within the website.

Once the user is authenticated, the user device (or the authentication application operating on the user device) and/or the authentication service may store credential(s) associated with the user. For example, the authentication application may store the credential(s) on memory of the user device (or within the browser memory). The credential(s) may represent and/or include the token, the email address, and the secret key. The credential(s) may be used in later instances for authenticating the user accessing the website. For example, at a later instance in which the user attempts to access the website, the authentication application may provide the credential(s) to the authentication service. The authentication service may compare the credential(s) to determine whether the credential(s) are still valid for permitting access to the website. For example, if the authentication service determines that the token has expired, the email address is not authorized, or that the secret key has expired, the authentication service may deny access to the website. As such, in later instances, the authentication service may authenticate the user using the credential(s), and without the authentication application requesting a token, the user entering his or her email address, or the user entering the secret key. In instances where the user is denied access at the later instances (e.g., not authenticated), however, the authentication application may request a new token from the authentication service, prompt the user to provide his or her email address, and/or prompt the user to enter a new secret key. Therein, the authentication service may attempt to authenticate the user, as described previously.

In some instances, and as alluded to above, the tokens and/or the secret keys may be valid for respective amounts of time. For example, the token and/or the secret key may be valid for ten minutes, one hour, one day, etc. Additionally, or alternatively, different users may be provided tokens and/or secret keys that are valid for different amounts of time. That is, based at least in part on an identify of the user (e.g., role), the tokens and/or the secret keys may be valid for certain amount of times. Furthermore, in some instances, after receiving the token, the user may have a predetermined amount of time to submit, or provide, his or her email address. Additionally, or alternatively, after providing the secret key to the user, the user may have a predetermined amount of time to submit, or provide, the secret key.

As discussed above, the user may be denied access to the website as various instances throughout the authentication process (e.g., invalid token, invalid/unauthorized email address, invalid secret key). In some instances, if the user is not authorized to access the web site, or if access to the website is otherwise denied (e.g., the user is not authenticated), the authentication application may display a window indicating such. For example, the window may display an error indication, an unauthorized indication, an unavailable indication, an error indication, and so forth. Additionally, or alternatively, the authentication application may reroute the user to other portals, login pages, website(s), etc. In some instances, the information or indication provided by the user may not identify the reason(s) why the user was denied access, but rather, that access to the website was unsuccessful. This may limit phishing attacks, tipping off the user, or otherwise notifying the user as to the reasons why he or she was not verified. For example, if the email address is not authorized, the authentication application may not indicate that the provided email address is not authorized.

During the authentication process, the authentication service may deny access to the web site if the browser is closed. For example, closing out of the browser (or other login/ credential portal for accessing a network resource) may cause the authentication application to stop running, may cause the authentication application to close, or the memory to be cleared (e.g., clearing the token, the secret key, the credentials, etc.). In such instances, the authentication process may restart upon the user reopening the browser, and the authentication application may request a new token. Therein, the user may enter the email address, the authentication service may generate a new token, and so forth.

Furthermore, while the above authentication process describes using an email address for use in authenticating the user, or to which the secret key is transmitted, other forms of communication may be used or other domains may be utilized. For example, rather than using an email address of the user, the user may provide a phone number. Therein, the authentication service may determine whether a user associated with the phone number is authorized to access the website by comparing the phone number against an approved database. If the phone number is associated with an authorized user, the authentication service may transmit (e.g., text, SMS, call, etc.) the secret key to a mobile phone of the user. The user may then enter the secret key for validation. In some instances, however, access to the websites may be provided based on IP addresses, geographical locations, and/or time (e.g., time of day when the websites are authorized to be access). Additionally, or alternatively, users may be permitted to access the website based on his or her position within a reporting structure (e.g., manager, technician, etc.). As such, the authentication service may use a plurality of domains, role-type, or identifiers, for providing access (or a particular type of access) to the web site. Moreover, although the discussion above relates to providing access to websites, or authenticating the user for websites, the forms of authentication discussed herein may extend to other network resources, resources, online environments, and/or login portals as well, such as online communication sessions (e.g., chatrooms), workspaces, desktop applications, databases, and so forth. For example, to access a desktop application, the user may be authenticated using the process described herein before access is provided.

In light of the above, the authentication process discussed herein may provide secure and verified access to content, such as content presented on websites. Using tokens, email addresses (or other identifiers), and secret keys may limit security concerns and provide secure access to content. At separate instances (or times), the authentication service may determine whether to provide access to the users using the tokens, the email addresses, and/or the secret keys. For example, at a first instance (or time), the authentication service determine whether the token is valid, at the second instance (or time), the authentication service may determine whether the token is valid and whether the email address is associated with an authorized user, and at the third instance (or time), the authentication service may determine whether the token is valid, whether the email address is associated with an authorized user, and whether the secret key is valid. In such instances, if an unauthorized user has access to the email address of an authorized user, and therefore able to obtain the secret key, the unauthorized user may not have access the necessary token on the memory of the user device to access to the website. Additionally, or alternatively, if the user device of the authorized user is stolen or misused by the unauthorized user, the authorized user may not have access to the email address of the authorized user for obtaining the secret key. As such, the unauthorized user may not be authenticated. This, in addition to the time thresholds associated with the token and the secret key, may increase security and limit access to the network resources, website (s), applications, desktops, and so forth. That is, as network resources may contain personal, private or sensitive data, the systems and methods herein may authenticate users to provide secure access to various forms of content. Given the increased concern for data security and maintaining privacy in the digital world, the systems and methods herein provide a solution for digitally authenticating users before providing access. Users are continuously authenticated to assure that access is still permitted, thereby further increasing security and concerns for data privacy.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates an example environment 100 for authenticating users 102 attempting to gain access to a network resource 104 (e.g., datacenter, website, applications, etc.). Although the discussion herein relates to the user 102 attempting to gain access to the network resource 104, the techniques discussed herein may be used in other situations as well, such as when the user 102 is attempting to access portals, mobile applications, desktop applications, online or digital environments, and so forth.

In some instances, the users 102 may utilize one or more user devices 106 for gaining access to the network resource 104. For example, the users 102 may utilize browsers or other applications operating on the user devices 106 for accessing the network resource 104. For example, the network resource 104 may represent a serverless website that requires the users 102 to be authenticated before accessed is gained to the network resource 104. In this sense, before the users 102 are provided access to the network resource 104, the users 102 may first be authenticated before the request of the users 102 to access the network resource 104 is processed or before the network resource 104 is displayed.

In some instances, an authentication service 108 may authenticate the users 102 attempting to gain access to the network resource 104, and which functions to limit access to authenticated users. In some instances, the authentication service 108 may be added or offered as a service or feature to pre-existing network resources or computer architectures. The network resource 104, or an operator/host of the network resource 104, may therefore employ the authentication service 108 to authenticate the users 102.

The authentication service 108 may be implemented as one or more servers and may, in some instances form a portion of a network-accessible computing service implemented as a computing infrastructure of processors, storage, software, data access, and so forth that is maintained and accessible via a network such as the Internet. Common expressions associated for the authentication service 108 may include "on-demand computing", "software as a service (SaaS)", "cloud services", "data centers", and so forth. The authentication service 108 may also execute various scripts, functions, or programs for carrying out the functions described herein (e.g., Python). In some instances, the authentication service 108, or components thereof, may host the network resource 104.

The authentication service 108 may include, or be associated with, an authentication application 110 stored or operating on the user devices 106. The authentication application 110 may represent an application program interface (API) of the authentication service 108 for interfacing with component(s) of the authentication service 108 to authenticate the users 102. The authentication application 110 may execute various scripts, functions, modules, components, or programs for carrying out the functions described herein. In some instances, the authentication application 110 may communicate, via one or more networks (e.g., Internet), with the authentication service 108 for authenticating the users 102. In some instances, a script or program may be loaded onto the network resource 104 which the user 102 is requesting access, and which the authentication service 108 is protecting. Collectively, the authentication service 108 and the authentication application 110 may therefore function to communicate back and forth to provide (or deny) the users 102 access to the network resource 104.

As shown, the authentication service 108 may include processor(s) 112 and computer-readable media 114 having access to or storing various forms of data, information, or content. The processor(s) 112 may carry out operations or functions performable by the authentication service 108, or processes the authentication service 108 is configured to perform to authenticate the users 102. The computer-readable media 114 may store or otherwise have access to various data, such as a user database 116, a network resource database 118 (e.g., the network resource 104), and a database 148 storing tokens 120, secret keys 122, email addresses 124, and/or credentials 126. As discussed herein, in turn, this data or the database 148 may be utilized in one or more instances for use in authenticating the users 102.

Furthermore, the authentication service 108 may include various components associated with authenticating the users 102. In some instances, the components may include a token generator 128, which may generate the tokens 120 stored in the database 148, a secret key generator 130, which may generate the secret keys 122 stored in the database 148, and/or an authorization component 132, which may function to authenticate the users 102 for permitting access to the network resource 104.

Upon the users 102 attempting to visit the network resource 104 (e.g., entering a website address into a browser), the authentication application 110 may intercept the request, receive the request, or otherwise determine that the users 102 are attempting to access the network resource 104. In some instances, the authentication service 108 may determine that the user 102 is attempting to access the network resource 104 based on receiving a request from the user device 106. Therein, the authentication service 108 may employ an authentication process for authenticating the user 102 attempting to access the network resource 104. As part of authenticating the user 102, the authentication service 108 may determine whether the user 102 is authorized to access the network resource 104.

As shown, the authentication application 110 may be stored on computer-readable media 134 of the user devices 106. The user devices 106 may also have processor(s) 136 for carrying out functions performable by the user devices 106, or as instructed by the authentication application 110. In some instances, the authentication application 110 may maintain a list, or database, of the network resources 104 which the users 102 must first be authenticated prior to providing access. For example, the authentication application 110 and the authentication service 108 may first authenticate the users 102 before the request of the users 102 to access the network resource 104 is forwarded to a component for providing the network resource 104 to the user 102. In other instances, the authentication of the users 102 may be determined by the authentication service 108. Regardless, the authentication service 108 may limit access to the network resource 104 to authenticated user 102, and when the authentication service 108 determines that a client or a user (e.g., the user 102) is attempting to access the network resource 104, the authentication service 108 may first function to authenticate the user.

In receiving the request to access the network resource 104, the authentication service 108 may determine whether the users 102 have a token 138. The authentication service 108 may also record a time associated with the user 102 requesting access to the network resource 104. The token 138 may represent a string of characters, an encrypted code, or other identifier associated with accessing the network resource 104. As shown, the token 138 is stored in the computer-readable media 134 of the user devices 106. If the authentication application 110 determines that the user 102 does not have the token 138, the authentication application 110 may transmit a request to the authentication service 108 to provide or generate the token 138. The authentication service 108 may generate the token 138, via the token generator 128, and may provide the token 138 to the user device 106. Therein, the user device 106 may store the token 138. However, in some instances, the user device 106 may await storing the token 138 until the user 102 is first authenticated. In some instances, the token generator 128 may generate a limited number of tokens per time period (e.g., minute, hour, etc.). Additionally, in some instances, the authentication service 108 may provide a limited number of tokens per time period and/or may provide a limited number of users 102 with access to the network resource 104 during a particular time period.

After receiving the token 138, or if the computer-readable media 134 has a previously stored token 138 (e.g., from a previous request), the authentication application 110 may transmit the token 138 to the authentication service 108. The authentication service 108, upon receiving the token 138, may determine whether the token 138 is valid and/or has expired. For example, the authorization component 132 of the authentication service 108 may compare the token 138 received from the user device 106 against the tokens 120 stored in the database 148. The database 148 may therefore be used by the authorization component 132 of the authentication service 108 to determine whether the token 138 is valid and/or has expired. For example, in some instances, each of the tokens 120 generated by the token generator 128 may include a time stamp or an amount of time each of the tokens 120 is valid. As part of determining whether the token 138 provided by the user (or the user device 106) is valid, the authorization component 132 may determine the time stamp of the token 138 (e.g., stored in association with the token 138 in the database 148). If the token 138 has expired, the authorization component 132 may determine that the token 138 is invalid. Additionally, or alternatively, if the authorization component 132 determines that the token 138, or that an indication or identifier thereof is not stored in the database 148, the authorization component 132 may determine that the token 138 is invalid. In these instances, if the token 138 is invalid, the authentication service 108 may transmit an indication of such to the user device 106. Therein, in some instances, the authentication application 110 may transmit a request to the authentication service 108 to transmit and/or generate a token (or a new token). The authentication service 108 may then cause the token generator 128 to generate a new token and/or transmit a new token back to the user device 106.

The user devices 106, or the authentication application 110, may then cause the new token to be stored in the computer-readable media (e.g., as the token 138). Noted above, in some instances, the newly generated token may be stored once the user 102 is authenticated. Therein, the authentication application 110 may transmit the token 138 to the authentication service 108. Again, the authorization component 132 may compare the provided token 138 against the tokens 120 in the database 148 to determine whether the token 138 is valid (e.g., has not expired). Upon determining that the token 138 is valid, the authentication service 108 may transmit an indication of such to the user device 106.

The authentication service 108, in addition to transmitting the indication that the token 138 is valid, may transmit a request or notification for the authentication application 110 to prompt the users 102 to enter or provide an email address. The authentication application 110, upon receiving the indication that the token 138 is valid or being promoted for the email address, may cause a modal, interface, or window to be presented on a display 140 of the user device 106. The window may prompt the user 102 to enter his or her the email address. After receiving the email address, the authentication application 110 may cause the user device 106 to transmit the email address, or an indication thereof, to the authentication service 108. Additionally, the authentication application 110 may also cause the user device 106 to transmit the token 138. Therefore, the user device 106 may transmit the token 138 and the email address.

The authentication service 108 (e.g., the authorization component 132) may then compare the email address of the user 102 against the email addresses 124 in the database 148, which may represent email addresses of users authorized or permitted to access the network resource 104. The email address may therefore serve as an identifier of the user 102 for use in determining whether the user 102 is authorized to access the network resource 104. For example, the authorization component 132 may determine whether the email address provided by the user 102 is on an approved or authorized list to access the network resource 104 (e.g., within the database 148). Additionally, the authorization component 132 may compare the token 138 with the tokens 120 in the database 148 to determine whether the token 138 is still valid (e.g., not expired). If the authentication service 108 determines that at least one of the token 138 is invalid or that the email address is not authorized (e.g., the user 102 associated with the email address is not permitted to access the network resource 104), the authentication service 108 may transmit an indication of such to the user device 106. Therein, the authentication application 110 may cause a window to be presented on the display 140 that indicates the user 102 is not verified, authorized, or permitted access to the network resource 104. In some instances, the authentication application 110 may reroute the user 102 to other portals or website to avoid providing insight why, or that, the request of the user 102 to access the network resource 104 was denied.

Alternatively, if the authorization component 132 determines that the token 138 is valid and that email address is authorized, the authentication service 108 may cause a secret key to be generated via the secret key generator 130. In some instances, the secret key may represent a string of characters, an encrypted key, or an additional token used for authenticating the user 102. As shown, the computer-readable media 114 of the authentication service 108 may store the secret keys 122 in the database 148. In some instances, the secret keys 122 within the database 148 may be associated with the token 138 and/or the email address of the user 102. Additionally, or alternatively, after determining that the user 102 is a user who is permitted to access the network resource 104, via the email address, the authentication service 108 may associate the token 138 and the email address with one another.

After generating the secret key, the authentication service 108 may transmit the secret key to the email address provided by the user 102. For example, using the provided email address, the authentication service 108 may send, to the email address, the secret key. The user 102 may obtain the secret key, via accessing his or her email on the user device 106, and may provide the secret key to the authentication application 110. For example, after the user 102 provides his or her email address, and if the token 138 is valid and the email address is authorized, the authentication application 110 may display a subsequent window that prompts the user 102 to enter the secret key. As such, the user 102 may enter the secret key into the window. Thereafter, the authentication application 110 may cause the user device 106 to transmit the token 138, the email address, and the secret key to the authentication service 108. In receiving the token 138, the email address, and the secret key, the authorization component 132 may determine whether the token 138 is valid, the email address is authorized, and the secret key is valid. For example, the authorization component 132 may compare the token 138 to the tokens 120, the email address to the email address 124, and the secret key to the secret keys 122 in the database 148 to determine whether the token 138 is valid (e.g., has not expired), whether the email address is authorized, and whether the secret key is valid (e.g., not expired). In some instances, the user 102 may have a predetermined amount of time to provide the secret key after the user 102 enters his or her email address and/or after the authentication service 108 provides the secret key 108. If the token 138 is valid, the email address is authorized, and the secret key is valid, the authentication service 108 may transmit an indication of such to the user device 106. In response to receiving this notification, the authentication application 110 may cause the window to disappear and permit access to the network resource 104. Additionally, or alternatively, upon authenticating the user 102, the authentication service 108 may cause the request of the user 102 to access the network resource 104 to be forwarded to the destination (e.g., the network resource 104) and/or may otherwise instruct the user device 106 to display the network resource 104. As such, if the token 138 is valid, the email address is authorized, and the secret key is valid, the user 102 may be authenticated and the identity of the user 102 may be verified for confirmed for providing access to the network resource 104.

Alternatively, if at least one of the token 138 is invalid, the email address is not authorized, or the secret key is invalid, the authentication service 108 may not authenticate the user 102 and may transmit an indication to the user device 106. Therein, the network resource 104 may be prevented from being displayed on the user device 106. For example, the authentication application 110 may cause a window to be presented on the display 140 that indicates the user 102 is not verified, authorized, or permitted access to the network resource 104. In some instances, the authentication application 110, however, may reroute the user 102 to other portals, pages, or website(s) to avoid providing insight why, or that, the request of the user 102 to access the network resource 104 was denied.

After the user 102 is authenticated via the authentication service 108, the authentication application 110 may cause credentials 142 to be stored in the computer-readable media 134 of the user device 106. The credentials 142 may, in some instances, correspond or include the token 138, an email address 144 (i.e., the provided email address), and/or a secret key 146. As such, after being authenticated at a first time, at a later instance in time when the user 102 attempts to gain access to the network resource 104, the authentication application 110 may provide the credentials 142 to the authentication service 108. For example, upon attempting to access the network resource 104, the authentication application 110 may provide the credentials 142 to the authentication service 108 for authentication. In such instances, the user 102 may avoid having to enter the email address 144 or the secret key 146, for example. Upon receiving the credentials 142, the authorization component 132 may compare the credentials 142 to the credentials 126 in the database 148. Such comparison may involve determining whether the token 138 (of the credentials 142) is valid, whether the email address 144 (of the credentials 142) is authorized, and/or whether the secret key 146 (of the credentials 142) is valid. If so, the authentication service 108 may again authenticate the user 102 and allow access to the network resource 104. However, once authenticated, the network resource 104 may still require certain authorization(s) for the user 102 to perform operations within or to the network resource 104.

In some instances, after determining that the user 102 is authenticated, access to the network resource 104 may be provided for a certain amount of time before the user 102 is required to be reauthenticated. For example, the credentials 142 of the user 102 may be valid for eight hours, after which, the user 102 may be required to request a new secret key for being authenticated, for example. Moreover, the user 102 may have a predetermined amount of time to be authenticated after first visiting the network resource 104. For example, after the user 102 enters the address of the network resource 104 into the browser, the user 102 may have a predetermined amount of time to be authenticated (e.g., ten minutes). In other words, if the user 102 is not authenticated by the authentication service 108 within a predetermined time, the user 102 may not be authenticated. The authentication service 108 may also limit a number of users permitted to access the network resource 104.

In some instances, the browser may indicate that the user 102 is authenticated. In some instances, a header of the browser may display an indication that the user is authenticated. Additionally, after authentication, the authentication service 108 may store the credentials 142 of the user 102 within the user database 116 on the computer-readable media 114.

In instances where the credentials 142 are invalid (e.g., the token 138 is invalid and/or has expired, the email address 144 is not authorized, or the secret key 146 is invalid and/or has expired), the authentication service 108 may deny access to the network resource 104. In response, the user 102 may be required to be authenticated again, such as entering his or her email address and/or providing a new secret key.

In some instances, while being authenticated, if the user 102 closes out of the browser or the authentication application 110, the authentication of the user 102 may restart. For example, if the user 102 provides his or her email address to the authentication application 110, but subsequently closes out of the browser, upon opening the browser, the user 102 may be required to reenter the his or her email address for receiving a new secret key. Closing out of the browser may also delete the token 138 saved in the computer-readable media 134. A new token may have to be obtained by the authentication application 110. In this sense, authenticating the user 102 may be a continuously process and if the browser is closed without the authentication process being completed, the user 102 may have to be re-authenticated. Additionally, or alternatively, after the user 102 is authenticated, closing out of the browser may require re-authentication.

While FIG. 1 and the authentication process herein describes using an email address for authentication, or to which the secret key is transmitted, other forms of user identifiers or communications/messages may be used for determining whether the user 102 is permitted to access the network resource 104. For example, rather than using an email address of the user 102, the user 102 may provide a mobile phone number of the user, GPS coordinates of the user 102 (or the user device 106), an IP address of the user, or identifier(s) of the user 102 (e.g., username)), a chat message ID of the user 102, etc. Herein, the authentication service 108 may compare the identifier, for example, to a database to determine whether the user 102 is authorized to access the network resource 104. If authorized, the authentication service 108 may transmit (e.g., text, SMS, call, chat message, via a mobile application, etc.) the secret key to a mobile phone of the user 102. The user 102 may then enter the secret key on the presented window for transmitting to the authentication service 108. Additionally, in some instances, access to the network resource 104 may be limited to certain times of day or for certain roles within an organizational structure. As such, the authentication service 108 may use a plurality of domains, or identifiers, of the user 102 for determining whether the user 102 is authorized to access the network resource 104.

As such, FIG. 1 illustrates a scenario whereby the authentication service 108 verifies that that the request for access came from the network resource 104 and not another actor sending request to the authentication service 108, or APIs of the authentication service. If confirmed, the authentication service 108 verifies that the email address (e.g., domain) is an approved email address, and if approved, sends the secret key (or an additional token) to the email address of the user 102. Therein, the user inputs the secret key and the authentication service validates the user 102.

Figure 2:
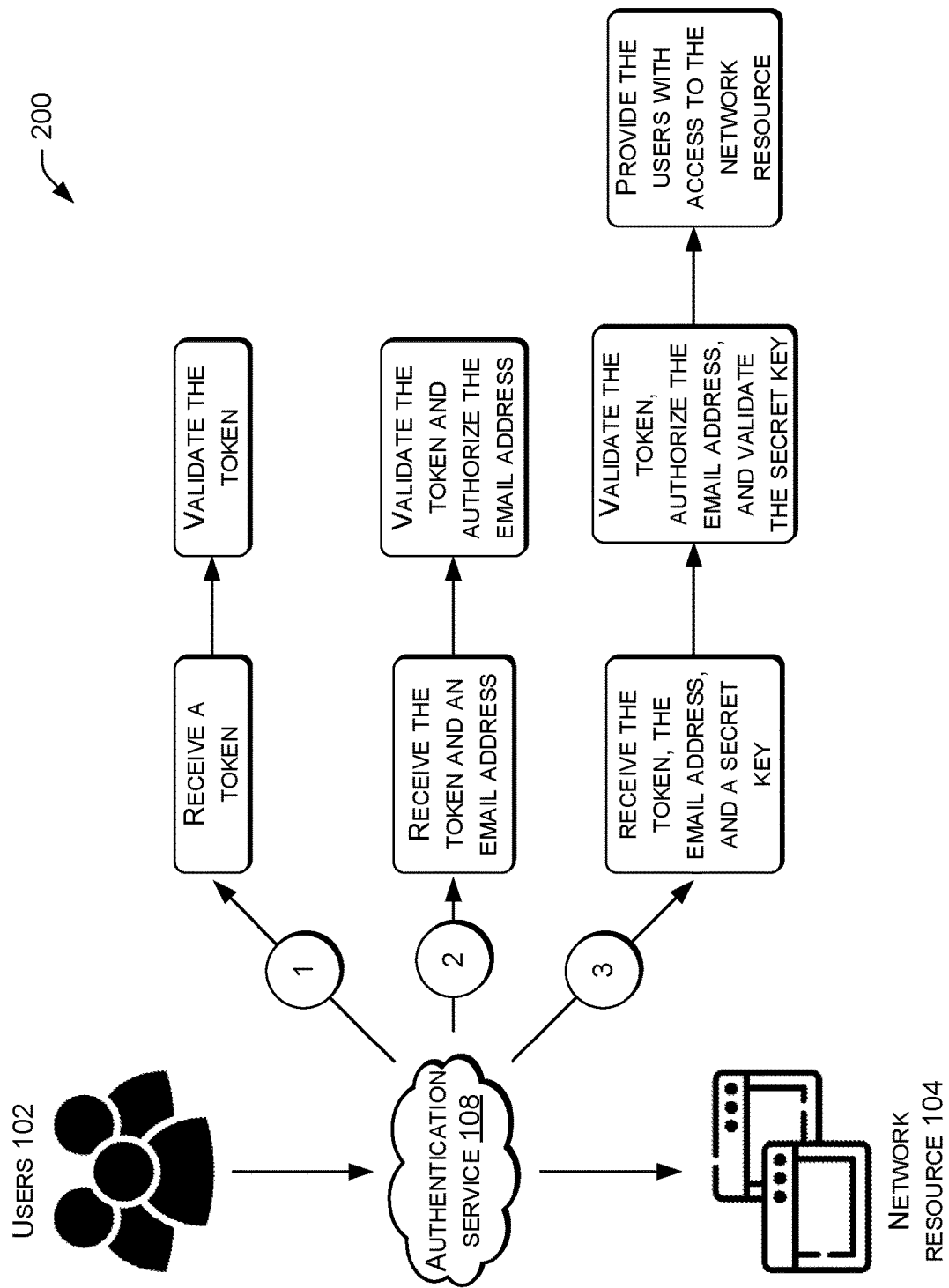
FIG. 2 illustrates an example illustration showing a multi-factor or multi-step process for authenticating a user accessing a network resource, according to an embodiment of the present disclosure.

FIG. 2 illustrates an example illustration 200 showing steps for authenticating the user 102. In some instances, authenticating the user 102 for accessing the network resource 104 may involve various steps or operations.

Initially, and upon requesting access to the network resource 104, the authentication service 108 may first validate the token 138 or determine whether the token 138 is valid. Accordingly, at "1" the first part of authenticating the user 102 may involve receiving the token 138 and validating the token 138. In some instances, and as discussed above, if the user 102 does not have the token 138, the authentication service 108 may generate and then transmit the token 138 to the user 102. Therein, after the token 138 is generated, the authentication service 108 may transmit the token 138 to the user device 106.

At "2" the second part of authenticating the user 102 may involve receiving the token and an email address of the user 102. For example, after receiving the token 138 from the authentication service 108 and validating the token (e.g., at "1"), the authentication application 110 may cause a window on the user device 106 to be presented. The window may request that the user 102 provide his or her email address. As such, the token 138 and the email address may then be provided to the authentication service 108. The authentication service 108 may then validate the token 138 and authorize the email address. If the token 138 is valid and the email address is authorized (e.g., the user 102 associated with the email address is authorized to access the network resource 104), the authentication service 108 may generate a secret key associated with the user 102 and transmit the secret key to the user 102 via his or her email address.

At "3" the third part of authenticating the user 102 may involve receiving the token, the email address, and the secret key. For example, after the secret key is provided to the user 102 at his or her email address, the user 102 may enter the secret key within a window presented by the authentication application 110 on the user device 106. After entering the secret key, the authentication service 108 may receive the token 138, the email address, and the secret key from the user device 106 (e.g., the authentication application 110 may provide the token 138, the email address, and the secret key to the authentication service 108). If the token 138 is valid, the email address is authorized, and the secret key is valid, the authentication service 108 may provide the users 102 access to the network resource 104. For example, the authentication application 110 may remove the window from the user device 106 and/or forward the request to access the network resource 104.

FIGS. 3-7 illustrate various processes related to authenticating users. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, and systems described in the examples herein, such as, for example those described with respect to FIGS. 1 and 2, although the processes may be implemented in a wide variety of other environments, architectures, and systems.

Figure 3:
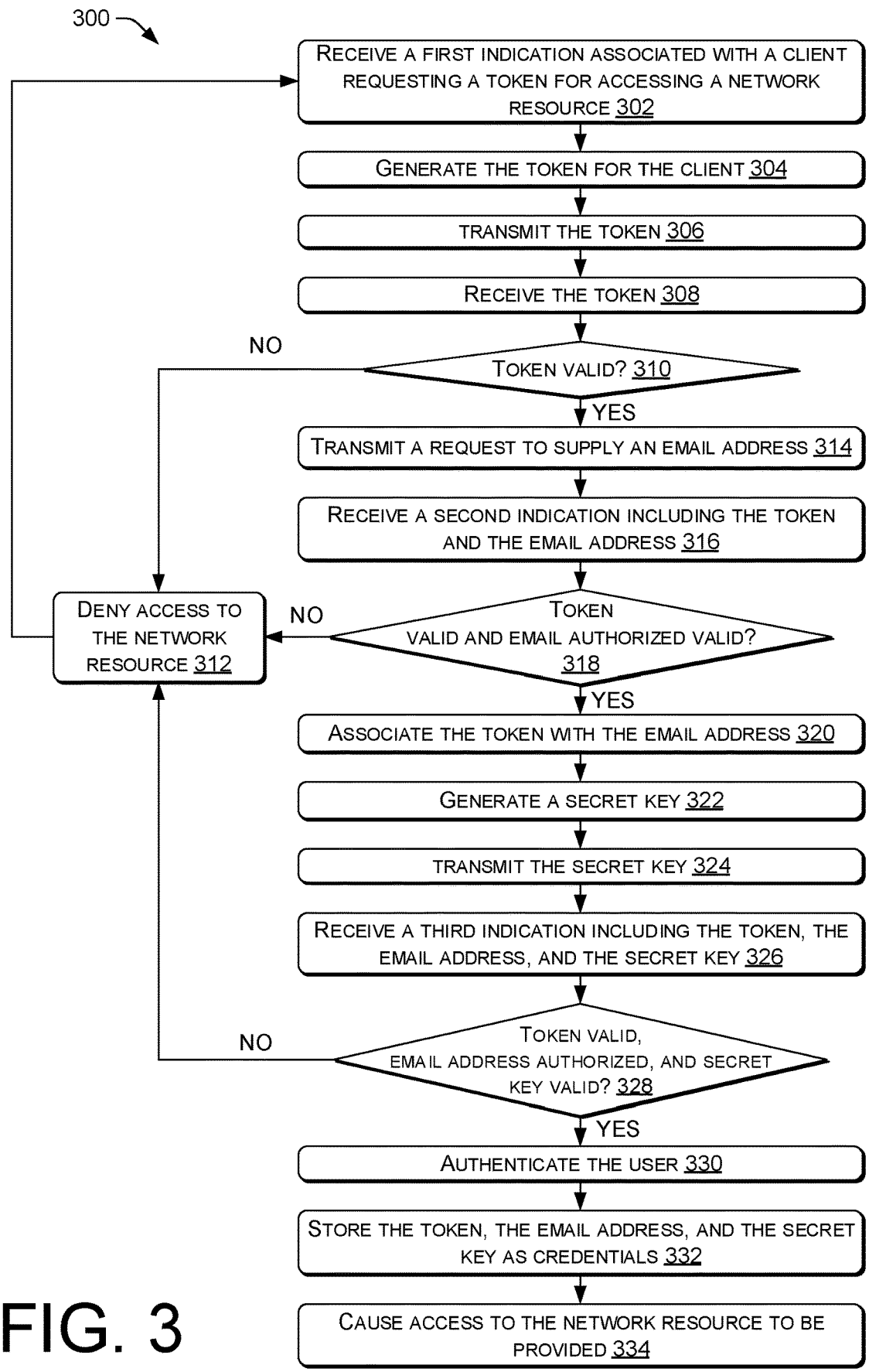
FIG. 3 illustrates an example process for authenticating a user accessing a network resource, according to an embodiment of the present disclosure.

FIG. 3 illustrates an example process 300 for authenticating the user 102 attempting to access the network resource 104. In some instances, the process 300 may represent operations performed from the perspective of the authentication service 108, or the operations performed at or by the authentication service 108 to authenticate the user 102.

At 302, the process 300 may receive a first indication associated with a client requesting a token for accessing a network resource. For example, the authentication service 108 may receive, from the user device 106 via the authentication application 110, a request for the token 138. Noted above, the token 138 may be utilized by the authentication service 108 for authenticating the client (e.g., the user 102) and providing access to the network resource 104.

At 304, the process 300 may generate the token. For example, the authentication service 108, or components thereof, such as the token generator 128, may generate the token 138. As part of generating the token 138, the authentication service 108 may determine a time stamp associated with the generation of the token 138 and/or an amount of time the token 138 is valid. The authentication service 108 may store an indication of the token 138 (and the time stamp) for use at later instances when authenticating the user 102. For example, the token 138 (or an indication thereof) may be stored in the database 148. In some instances, the token 138 may be associated with the user 102, or stored in association with the user 102, such that the token 138 is valid for use by the user 102.

At 306, the process 300 may transmit the token. For example, the authentication service 108, or components thereof, may transmit the token 138 to the user device 106.

At 308, the process 300 may receive the token. For example, the authentication service 108 may receive the token 138 from the user device 106. The authentication application 110 running on the user device 106 may cause the token 138 to be transmitted to the authentication service 108.

At 310, the process 300 may determine whether the token is valid. For example, the authorization component 132 of the authentication service 108 may compare the token 138 with the tokens 120 in the database 148 to determine whether the token 138 is valid. Additionally, the authorization component 132 may compare a time stamp associated with the generation of the token 138 against a time threshold to determine whether the token 138 has expired.

If at 310 the process 300 determines that the token 138 is invalid and/or has expired, the process 300 may follow the "NO" route and continue to 312, whereby the authentication service 108 may deny access to the network resource 104. For example, the authentication service 108 may transmit an indication to the authentication application 110 that the token is invalid and/or has expired. In response the authentication service 108, via the authentication application 110, may deny access to the network resource 104. In some instances, denying access to the network resource 104 may involve the authentication application 110 withholding the request of the user 102 to access the network resource 104 (e.g., not transmitting the request to a gateway or portal of the network resource 104) and/or the authentication service 108 may not display the network resource 104. From 312, the process 300 may loop to 302, whereby the authentication service 108 may receive the request of the user 102. In turn, the process 300 may generate a new token for the user 102.

Alternatively, if at 310 the process 300 determines that the token 138 is valid, the process 300 may follow the "YES" route and proceed to 314. At 314, the process 300 may transmit a request for the user to supply an email address associated with the user. For example, the authentication service 108 may transmit a request to the user device 106 requesting that the user 102 provide the email address. The authentication application 110 operating on the user device 106 may receive this request and cause a window to be presented on the display 140 of the user device 106. The user 102 may enter his or her email address within the window, and the authentication application 110 may provide the email address to the authentication service 108.

At 316, the process 300 may receive a second indication including the token and the email address of the user. For example, the authentication service 108 may receive, from the user device 106, the token 138 and the email address of the user 102.

At 318, the process 300 may determine whether the token is valid and whether the email address is authorized. For example, the authorization component 132 may compare the token 138 to the tokens 120 in the database 148 to determine whether the token 138 is still valid (e.g., has not expired). Additionally, the authorization component 132 may compare the email address of the user 102 with the email addresses 124 in the database 148 to determine whether the email address is authorized or otherwise associated with the client (or the user 102) who is authorized to access the network resource 104. For example, access to the network resource 104 may be controlled or limited to certain users 102 using their email address. However, other identifier(s) or data may be used to control access (e.g., time, location, etc.). Upon receiving the email address (or an indication thereof), the authorization component 132 may compare the email address with the email addresses 124 in the database 148 to determine whether the email address is authorized. If the token 138 is invalid or the email address is not authorized, the process 300 may follow the "NO" route and proceed to 312. Alternatively, if the token 138 is valid and the email address is authorized, the process 300 may follow the "YES" route and proceed to 320.

At 320, the process 300 may associate the token with the email address. For example, after the client issues a request for the token 138, and the token is then stored in the browser (or memory of the user device 106), the token 138 may become associated with the email address (or the user 102) after step 318 and the "YES" route. In other words, in some instances, prior to the user 102 supplying his or her email address, the user 102 has not provided identifying information. Therefore, after the token 138 is valid and the email address are authorized 318, at 320, the token 138 may be associated with the email address, or vice versa.

At 322, the process 300 may generate a secret key for the user. For example, the authentication service 108, or components thereof, such as the secret key generator 130, may generate the secret key. As part of generating the secret key, the authentication service 108 may determine a time stamp associated with the generation of the secret key and/or an amount of time the secret key is valid. The authentication service 108 may store an indication of the secret key (and the time stamp) for use at later instances when verifying the user 102. For example, the secret key (or an indication thereof) may be stored in the database 148. In some instances, the secret key may be associated with the user 102 and/or the token 138, or stored in association with the user 102.

At 324, the process 300 may transmit the secret key to the user. For example, the authentication service 108 may transmit the secret key to the user 102 at his or her email address. That is, the authentication service 108 may utilize the provided email address to transmit the secret key to the email address. However, in some instances, the secret key may be provided to the user 102 using other communication methods (e.g., text).

At 326, the process 300 may receive a third indication including the token, the email address, and the secret key. For example, the authentication service 108 may receive, from the user device 106, the token 138, the email address, and the secret key. The authentication application 110 operating on the user device 106 may display a window on the display 140 of the user device 106, and the user 102 may enter the secret key within the window. Therein, after receiving the email address, the authentication application 110 may cause the user device 106 to transmit the token 138, the email address, and the secret key to the authentication service 108.

At 328, the process 300 may determine whether the token is valid, the email address is authorized, and the secret key is valid. For example, the authorization component 132 may compare the token 138 to the tokens 120 in the database 148 to determine whether the token 138 is valid, may compare the email address with the email addresses 124 in the database 148 to determine whether the user 102 associated with the email address is authorized to access the network resource 104, and may compare the secret key with the secret keys 122 in the database 148 to determine whether the secret key is valid. In some instances, the authorization component 132 may compare a time stamp associated with the generation of the secret key against a time threshold to determine whether the secret key has expired. If the token 138 is invalid, the email address is not authorized, or the secret key are invalid, the process 300 may follow the "NO" route and proceed to 312. Alternatively, if the token 138, the email address, and the secret key are valid, the process 300 may follow the "YES" route and proceed to 330.

At 330, the process 300 may authenticate the user. For example, based at least in part on the token 138 being valid, the user 102 being permitted to access the network resource 104 (via identifying the user 102 using the email address), and the secret key being valid, the user 102 may be authenticated. In some instances, authenticating the user 102 may serve to confirm or verify the identity of the user 102 and that the user 102 is permitted to access the network resource 104.

At 332, the process 300 may store the token, the email address, and the secret key as credentials of the user. For example, after authenticating the user 102 at 328, the authentication service 108 may store the token 138, the email address, and the secret key as credentials 126 within the database 148. The credentials 126 may be stored in association with the user 102 for use at later instances to authenticate the user 102 (e.g., the user database 116). For example, at a later instance when the user 102 attempts to access the network resource 104, the authentication service 108 may receive the credentials 142 from the user device 106 and compare the credentials 142 against the credentials 126 in the database 148 to determine whether the user 102 is authenticated.

At 332, the process 300 may cause access to the network resource to be provided. For example, after authenticating the user 102, the authentication service 108 may transmit an indication to the user device 106. The authentication application 110 may receive the indication, forward the request of the user 102 to access the network resource 104, or may otherwise display the network resource 104 (e.g., as instructed by the authentication service 108). In some instances, the authentication application 110 may cause a window on the user device 106 to be removed, or disappear, for allowing the user 102 to access the network resource 104. In some instances, even after being authenticated, the user 102 may be required to be authorized for performing certain actions within the network resource 104.

Figure 4:
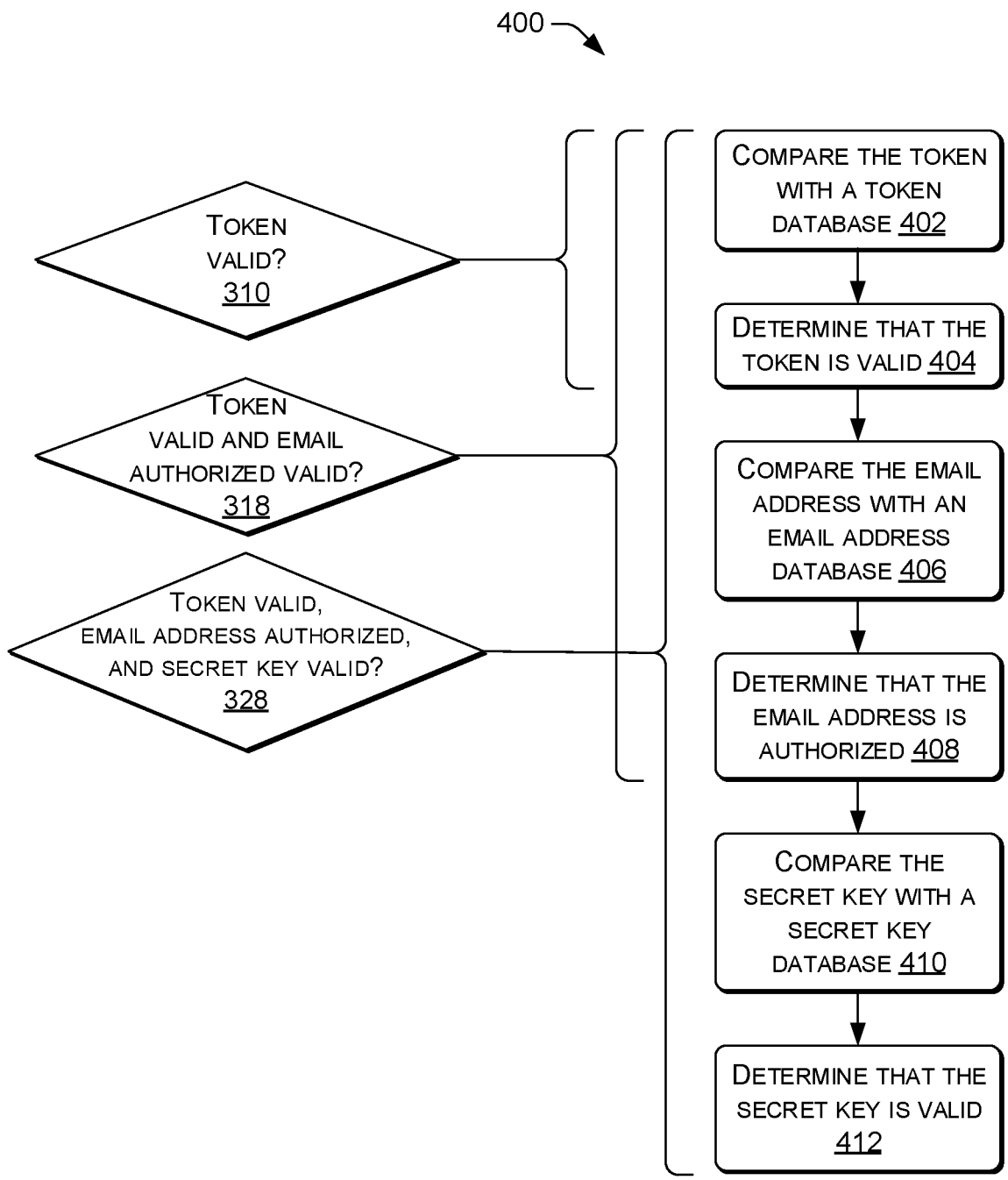
FIG. 4 illustrates an example process associated with comparing credentials of a user for authenticating the user accessing a network resource, according to an embodiment of the present disclosure.

FIG. 4 illustrates an example process 400, showing detailed operations of the process 300. In some instances, the process 400 may be an extension of, or include additional operations performed by the process 300.

As discussed above, at 310, the process 300 may determine whether the token is valid. For example, at 402, the process 400 may compare the token 138 received from the user device 106 (via the authentication application 110) to the tokens 120 in the database 148. Comparing the token 138 to the tokens 120 in the database 148 may involve comparing the token 138 against the stored tokens 120 (or indications thereof) in the database 148 and/or comparing a time stamp associated with the generation of the token 138 against a time threshold. For example, if the token 138 was generated more than a threshold amount of time ago, the token 138 may be expired.

If the authorization component 132 of the authentication service 108 determines that the token 138 is valid (e.g., the token 138 is a valid token and has not expired), the process 400 may proceed to 404 whereby the process 400 may determine that the token 138 is valid.

In some instances, the operation 310 for determining whether the token 138 is valid may be performed at a first instance (or time) or during a first instance (or time). That is, at a first instance, the operations 402 and 404 may be performed for comparing the token 138 against the tokens 120 in the database 148 for determining that the token 138 is valid.

As discussed above, at 318, the process 300 may determine whether the token is valid and whether the email address is authorized. Discussed above, determining whether the token 138 is valid may involve the operations 402 and 404. Additionally, the operation 318 may involve the operations 406 and 408 for determining whether the email address is authorized. At 406, the process 400 may compare the email address received from the user device 106 (via the authentication application 110) to the email addresses 124 in the database 148. Comparing the email address to the email addresses 124 in the database 148 may involve comparing the email address against the stored email addresses 124 (or indications thereof) in the database 148. Other identifiers may also be used for authenticating the user 102.

If the authorization component 132 of the authentication service 108 determines that the email address is included in the database 148, the process 400 may proceed to 408 whereby the process 400 may determine that the email address is authorized.

In some instances, the operation 318 for determining whether the token 138 is valid and whether the email address is authorized may be performed at a second instance (or time) or during a second instance (or time). That is, at a second instance, after the first instance, the operations 402, 404, 406, and 408 may be performed for comparing the token 138 against the tokens 120, determining that the token 138 is valid, comparing the email address against the email addresses 124, and determining that the email address is authorized.

As discussed above, at 328, the process 300 may determine whether the token is valid, whether the email address is authorized, and whether the secret key is valid. As shown and discussed above, determining whether the token 138 is valid and whether the email address is authorized may involve the operations 402, 404, 406, and 408, respectively. Additionally, determining whether the secret key is valid may involve the operations 410 and 412. At 410, the process 400 may compare the secret key received from the user device 106 (via the authentication application 110) to the secret keys 122 in the database 148. Comparing the secret key to the secret keys 122 may involve comparing the secret key against the stored secret keys (or indications thereof) in the database 148 and/or comparing a time stamp associated with the generation of the secret key against a time threshold. For example, if the secret key was generated more than a threshold amount of time ago, the secret key may be expired.

If the authorization component 132 determines that the secret key is included in the database 148 and has not expired, in addition to determining that the token is valid and the email address is authorized, the process 400 may proceed to 412 whereby the process 400 may determine that the secret key is valid.

In some instances, the operation 328 for determining whether the token 138 is valid, the email address is authorized, and the secret key is valid may be performed at a third instance (or time) or during a third instance (or time). That is, at a third instance, after the second instance, the operations 402, 404, 406, 408, 410, and 412 may be performed, respectively, for comparing the token 138 against the tokens 120 in the database 148, determining that the token 138 is valid, comparing the email address against the email addresses 124 in the database 148, determining that the email address is authorized, comparing the secret key against the secret keys 122 in the database 148, and determining that the secret key is valid. Therein, the user 102 may be authenticated.

Figure 5:
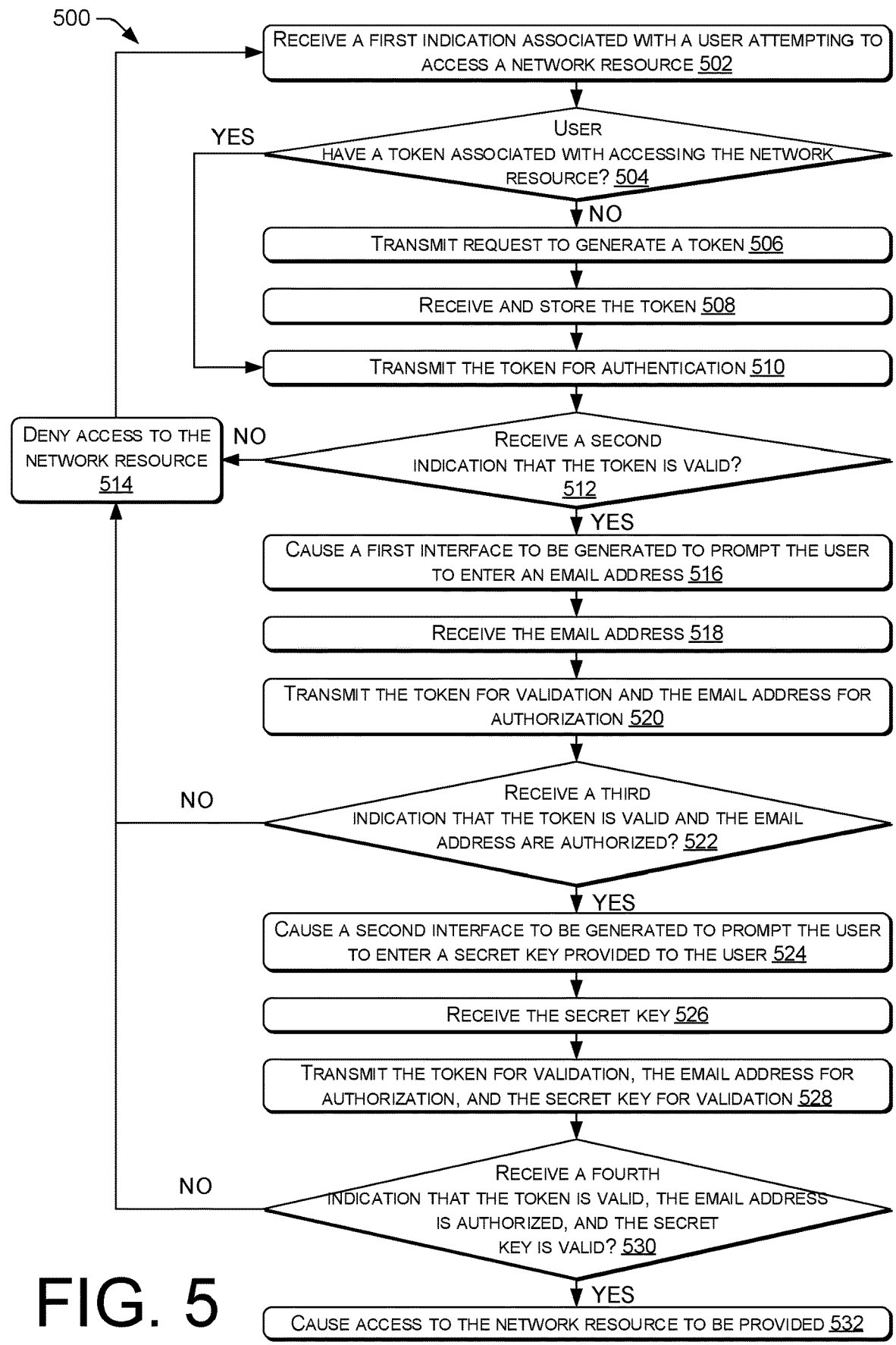
FIG. 5 illustrates an example process for providing and receiving credentials of a user for authenticating the user accessing a network resource, according to an embodiment of the present disclosure.

FIG. 5 illustrates an example process 500 for authenticating the user 102 attempting to access the network resource 104. In some instances, the process 500 may include operations performed from the perspective of the user device 106, or the operations performed by the authentication application 110 operating on the user device 106 to authenticate the user 102.

At 502, the process 500 may receive a first indication associated with a user requesting access to a network resource. For example, the authentication application 110 may receive a request associated with the user 102 attempting to access the network resource 104. In some instances, the authentication application 110 may otherwise determine that the user 102 is attempting to access the network resource 104 (e.g., receive indication from the browser and/or the authentication service 108).

At 504, the process 500 may determine whether the user has a token associated with accessing the network resource. For example, the authentication application 110 may determine whether the token 138 is stored on the computer-readable media 134 of the user device 106. The authentication application 110 may therefore access the computer-readable media 134 of the user device 106 to determine whether the user 102 has the token 138. If at 504 the process 500 determines that the user 102 does not have the token 138, the process 500 may follow the "NO" route and proceed to 506.

At 506, the process 500 may transmit a request to generate a token. For example, the authentication application 110 may generate a request for the token 138 and instruct the user device 106 to transmit the request to the authentication service 108 for generating the token 138.

At 508, the process 500 may receive and store the token. For example, after the authentication service 108 generates and transmits the token 138, the user device 106 may receive the token 138. In such instances, the authentication application 110 may be provided the token 138 or may otherwise have access to the token 138. After receiving the token 138, the authentication application 110 may cause the token 138 to be stored in the computer-readable media 134 of the user device 106. In some instances, the authentication application 108 may not store the token 138 until the user 102 is authenticated, as discussed herein.

At 510, the process 500 may transmit the token for authentication. For example, the authentication application 110 may instruct or cause the user device 106 to transmit the token 138 to the authentication service 108 (or components thereof). As discussed herein, the authentication service 108 (e.g., the authorization component 132) may determine whether the token 138 is valid and/or has not expired.

Alternatively, the process 500 illustrates that if the user 102 does have the token 138 associated with accessing the network resource 104, the process 500 may follow the "YES" route, from 504, and proceed to 510.

At 512, the process 500 may determine whether a second indication is received indicating that the token is valid. For example, after transmitting the token 138 to the authentication service 108, the authentication application 110 running on the user device 106 may determine whether an indication is received indicating or notifying that the provided token 138 is valid. If the authentication application 110 does not receive the indication that the token 138 is valid and/or receives an indication that the token 138 is invalid, the process 500 may follow the "NO" route and proceed to 514. In some instances, the process 500 may proceed to 514 if the authentication application 110 does not receive an indication that the token 138 is valid and/or invalid after a predetermined threshold time (e.g., timeout).

At 514, the process 500 may deny access to the network resource. For example, if the authentication application 110 receives an indication that the token 138 is invalid, the authentication application 110 may deny access to the network resource 104 (e.g., may not forward the request of the user 102 and/or may cause the network resource 104 to not be displayed on the user device 106). In some instances, the authentication application 110 may be instructed by the authentication service 108 to deny (or not provide) access to the network resource 104. In this sense, the authentication service 108 may cause the authentication application 110 to deny access to the network resource 104. In some instances, denying access to the network resource 104 may involve the authentication application 110 withholding the request of the user 102 to access the network resource 104 (e.g., the authentication application 110 may not transmit the request to a gateway or portal of the network resource 104). From 514, the process 500 may loop to 502, whereby the authentication application 110 may receive the request of the user 102. In turn, the process 500 may generate a new token 138 for the user 102.

Alternatively, if the process 500 does receive the second indication that the token 138 is valid, the process 500 may follow the "YES" route and proceed to 516. At 516, a first interface may be caused to be generated to prompt the user to enter an email address. For example, the user device 106 may display a modal or interface that requests or prompts the user 102 to enter his or her email address. In some instances, as part of receiving the second indication at 512, the authentication service 108 may provide the authentication application 110 with a request to prompt the user 102 for his or her email address. Additionally, or alternatively, the authentication application 110 may prompt the user 102 to enter his or her email address based at least in part on receiving the second indication. However, noted above, other forms of communication and/or other identifiers may be used for authenticating the user 102 (e.g., location, time, role, etc.).

At 518, the process 500 may receive the email address of the user. For example, the user 102 may enter his or her email address into the interface generated by the authentication application 110 and displayed on the user device 106. In such instances, the authentication application 110 may instruct the display 140 of the user device 106 to present the interface.

At 520, the process 500 may transmit the token for validation and the email address for authorization. For example, the authentication application 110 may instruct or cause the user device 106 to transmit the token 138 and the email address to the authentication service 108 (or components thereof). The authentication service 108 (e.g., the authorization component 132) may determine whether the token 138 is valid and whether the email address is associated with an authorized user.

At 522, the process 500 may determine whether a third indication is received indicating that the token is valid and the email address is authorized. For example, after transmitting the token 138 and the email address to the authentication service 108, the authentication application 110 running on the user device 106 may determine whether an indication is received indicating or notifying that the provided token 138 is valid and whether the email address is authorized. If the authentication application 110 does not receive the indication that the token 138 is valid and the email address is authorized and/or receives an indication that the token 138 is invalid or the email address is not authorized, the process 500 may follow the "NO" route and proceed to 514. In some instances, the process 500 may proceed to 514 if the authentication application 110 does not receive an indication that the token 138 is valid and the email address is authorized after a predetermined threshold time (e.g., timeout).

Alternatively, if the process 500 receives the third indication that the token 138 is valid and the email address is authorized, the process 500 may follow the "YES" route and proceed to 524. At 524, a second interface may be caused to be generated to prompt the user to enter a secret key. For example, the user device 106 may display a modal or interface that requests or prompts the user 102 to enter the secret key. As discussed above, the secret key may be generated by the authentication service 108 based at least in part on determining that the token 138 is valid and the email address is authorized. In such instances, the authentication service 108 may provide the secret key to the email address of the user 102. In some instances, as part of receiving the second indication at 522, the authentication service 108 may provide the authentication application 110 with a request or instruction to prompt the user 102 to enter the secret key. Additionally, or alternatively, the authentication application 110 may prompt the user 102 to enter the secret key based at least in part on receiving the third indication.

At 526, the process 500 may receive the secret key. For example, the user 102 may access his or her email address on the user device 106, obtain the secret key, and then enter the secret key into the interface generated by the authentication application 110 and displayed on the user device 106. In such instances, the authentication application 110 may instruct the display 140 of the user device 106 to present the interface.

At 528, the process 500 may transmit the token for validation, the email address for authorization, and the secret key for validation. For example, the authentication application 110 may instruct or cause the user device 106 to transmit the token 138, the email address, and the secret key to the authentication service 108 (or components thereof). In turn, the authentication service 108 (e.g., the authorization component 132) may determine whether the token 138 is valid, the email address is authorized, and the secret key is valid.

At 530, the process 500 may determine whether a fourth indication is received indicating that the token is valid, the email address is authorized, and the secret key is valid. For example, after transmitting the token 138, the email address, and the secret key to the authentication service 108, the authentication application 110 running on the user device 106 may determine whether an indication is received indicating or notifying that the provided token 138 is valid, the email address is authorized, and the secret key is valid. If the authentication application 110 does not receive the indication and/or if the authentication application 110 receives an indication that the token 138 is invalid, the email address is not authorized, or the secret key is invalid, the process 500 may follow the "NO" route and proceed to 514. In some instances, the process 500 may proceed to 514 if the authentication application 110 does not receive an indication that the token 138 is valid, the email address is not authorized, and the secret key is valid after a predetermined threshold time (e.g., timeout).

Alternatively, if the process 500 receives the fourth indication the process 500 may follow the "YES" route and proceed to 532. At 532, the process 500 may cause access to the network resource to be provided. For example, after the user 102 is authenticated using the token 138, the email address, and the secret key, the authentication service 108 may transmit an indication to the user device 106. The authentication application 110 may receive the indication and forward the request of the user 102 to access the network resource 104. In some instances, the authentication application 110 may cause a window on the user device 106 to be removed, or disappear, for allowing the user 102 to access the network resource 104.

Figure 6:
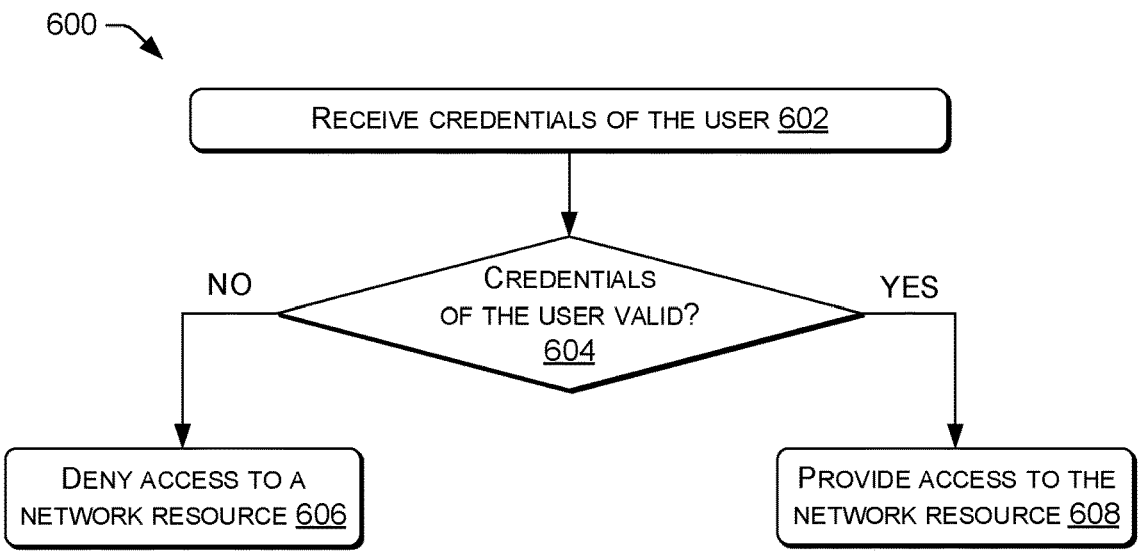
FIG. 6 illustrates an example process for authenticating a user accessing a network resource, according to an embodiment of the present disclosure.

FIG. 6 illustrates a process 600 for authenticating the user 102 attempting to access the network resource 104. In some instances, the process 600 may be performed after the process 300. For example, after the user 102 has been provided access to the network resource 104, the user 102 may navigate within the network resource 104, modify content of the network resource 104, post to the network resource 104, and so forth. In some instances, the network resource 104 may require further authorizations of the user 102 before the user 102 is permitted to perform actions within the network resource 104. However, rather than the user 102 providing his or her email address and the secret key each time the user 102 navigates with the network resource 104 or performs an action within the network resource 104, in some instances, the user 102 may be authenticated using the credentials 142, which may include or represent the token 138, the email address, and the secret key.

At 602 the process 600 may receive the credentials. For example, the authentication service 108 may receive, from the user device 106, the credentials 142. In some instances, the authentication application 110 operating on the user device 106 may instruct the user device 106 to transmit the credentials 142.

At 604, the process 600 may determine whether the credentials of the user are valid. For example, the authorization component 132 may compare the credentials 142 with the credentials 126 in the database 148. In some instances, as the credentials 142 may include or represent the token 138, the email address, and the secret key, determining whether the credentials 142 are valid may include determining whether the token 138 is valid, whether the email address is authorized, and whether the secret key is valid. If the credentials are invalid, or the user is not authenticated, the process 600 may follow the "NO" route and proceed to 606.

At 606, the process 600 may deny access to the network resource. For example, the authentication service 108 may transmit an indication to the authentication application 110 that the token is invalid and/or has expired. In response the authentication service 108, via the authentication application 110, may deny access to the network resource 104.

Alternatively, if at 604 the process 600 determines that the credentials are valid, the process 600 may follow the "YES" route and proceed to 608. At 608, the user may be authenticated and the process 608 may cause access to the network resource to be provided. For example, after authenticating the user 102, the authentication service 108 may transmit an indication to the user device 106. The authentication application 110 may receive the indication, forward the request of the user 102 to access the network resource 104, or otherwise display the network resource 104 (e.g., as instructed by the authentication service 108).

Figure 7:
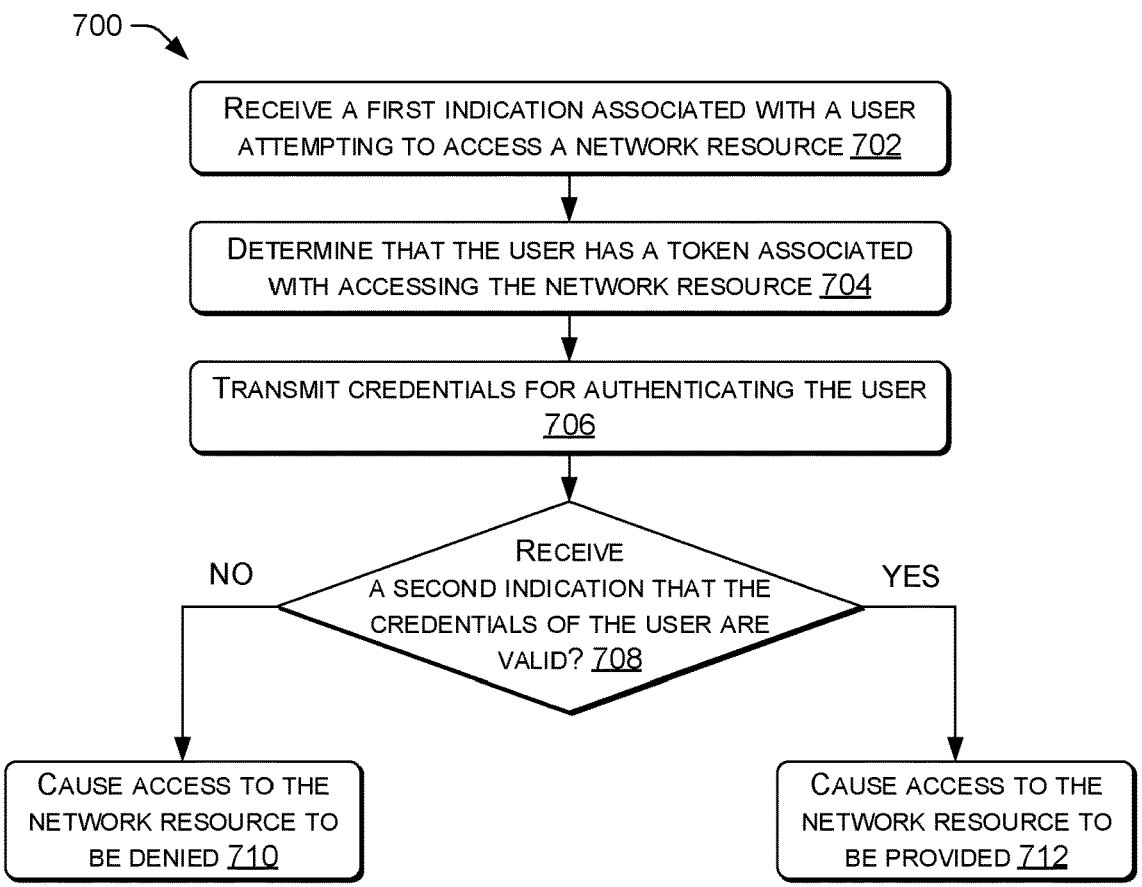
FIG. 7 illustrates an example process for authenticating a user accessing a network resource, according to an embodiment of the present disclosure.

FIG. 7 illustrates a process 700 for authenticating the user 102 attempting to access the network resource 104. In some instances, the process 700 may be performed after the process 500. For example, after the user 102 has been provided access to the network resource 104, the user 102 may navigate within the network resource 104, modify content of the network resource 104, post to the network resource 104, and so forth. However, rather than the user 102 providing his or her email address and the secret key each time the user 102 navigates with the network resource 104 or performs an action within the network resource 104, the user 102 may be authenticated using the credentials 142, which may include or represent the token 138, the email address, and the secret key.

At 702, the process 700 may receive a first indication associated with a user attempting to access to a network resource. For example, the authentication application 110 may receive a request associated with the user 102 attempting to access the network resource 104.

At 704, the process 700 may determine that the user has a token associated with accessing the network resource. For example, the authentication application 110 may determine that the token 138 is stored in the computer-readable media 134 of the user device 106. As noted above, the token 138 may be stored on the user device 106 based on the user 102 previously accessing the network resource 104.

At 706, the process 700 may transmit the credentials for authenticating the user. For example, the authentication application 110 may instruct or cause the user device 106 to transmit the credentials 142 to the authentication service 108 (or components thereof). In turn, the authentication service 108 (e.g., the authorization component 132) may determine whether the credentials 142 are valid.

At 708, the process 700 may determine whether a second indication is received indicating that the credentials are valid. For example, after transmitting the credentials 142 to the authentication service 108, the authentication application 110 running on the user device 106 may determine whether an indication is received indicating or notifying that the credentials 142 are valid. If the authentication application 110 does not receive the indication that the credentials 142 are valid and/or if the authentication application 110 receives an indication that the credentials 142 are invalid, the user 102 may not be authenticated and the process 500 may follow the "NO" route and proceed to 710. In some instances, the process 700 may proceed to 710 if the authentication application 110 does not receive an indication that the credentials 142 are valid and/or invalid after a predetermined threshold time (e.g., timeout).

At 710, the process 500 may deny access to the network resource. For example, if the authentication application 110 receives an indication that the credentials 142 are invalid, the authentication application 110 may deny access to the network resource 104. From 710, in some instances, the process 700 may proceed to the process 500 whereby the authentication application 110 may request a new token 138 for authenticating the user 102.

Alternatively, if at 708 the process 700 determines that the credentials are valid, the process may follow the "YES" route and proceed to 712. For example, after the user 102 is authenticated, the authentication application 110 may receive an indication of such and forward the request of the user 102 to access the network resource 104.

Figure 8:
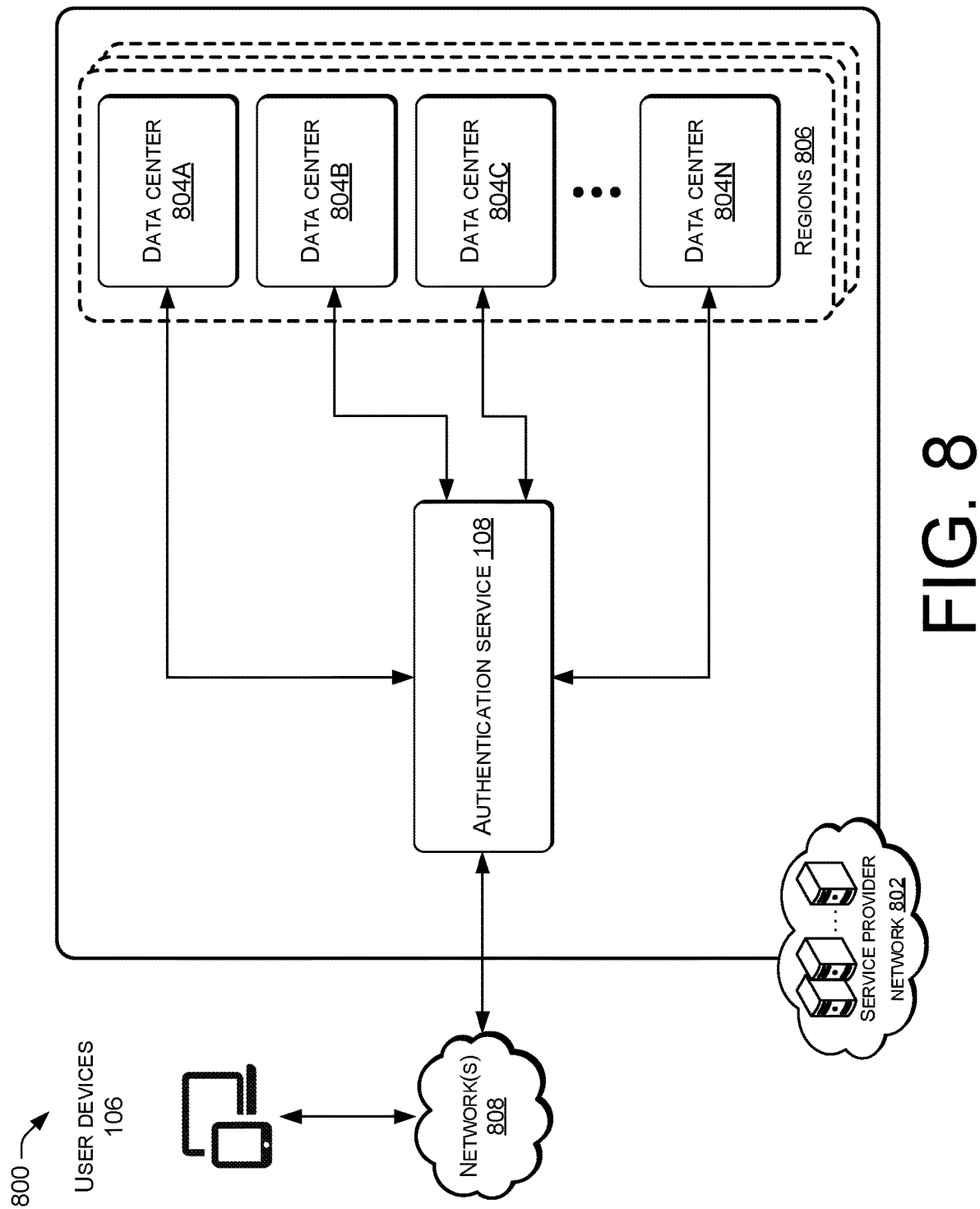
FIG. 8 illustrates an example system and network diagram that shows an operating environment including a service provider network that may be configured to implement aspects of the functionality described herein, according to an embodiment of the present disclosure.

FIG. 8 is a system and network diagram that shows an illustrative operating environment 800 that includes a service provider network 802. The service provider network 802 may be configured to implement aspects of the functionality described herein, such as the functions of the authentication service 108 to authenticate the users 102 accessing the network resource 104. The service provider network 802 may provide computing resources, like virtual machine (VM) instances and storage, on a permanent or an as-needed basis. The computing resources provided by the network service provider 802 may include data processing resources, data storage resources, networking resources, data communication resources, network services, and the like. Among other types of functionality, the computing resources provided by the service provider network 802 may be utilized to implement the various services and components described above.

Each type of computing resource provided by the service provider network 802 may be general-purpose or may be available in a number of specific configurations. For example, data processing resources may be available as physical computers or VM instances in a number of different configurations. The VM instances may be configured to execute applications, including web servers, application servers, media servers, database servers, gaming applications, and/or other types of programs. Data storage resources may include file storage devices, block storage devices, and the like. The service provider network 802 may also be configured to provide other types of computing resources not mentioned specifically herein.

The computing resources provided by the service provider network 802 may be enabled in one embodiment by one or more data centers 804A-804N (which might be referred to herein singularly as "a data center 804" or in the plural as "the data centers 804"). The data centers 804 are facilities utilized to house and operate computer systems and associated components. The data centers 804 typically include redundant and backup power, communications, cooling, and security systems. The data centers 804 may also be located in geographically disparate locations, or regions 806. One illustrative embodiment for a data center 804 that may be utilized to implement the technologies disclosed herein will be described below with regard to FIG. 9.

The users 102, or the network resource 104 that utilize the service provider network 802 for the authentication service 108, may access the computing resources provided by the service provider network 802 over any wired and/or wireless network(s) 808, which may be a wide area communication network ("WAN"), such as the Internet, an intranet or an Internet service provider ("ISP") network or a combination of such networks. For example, and without limitation, the user devices 106 operated by the users 102 of the service provider network 802 may be utilized to access the service provider network 802, or computing resources thereof, by way of the network(s) 808. It should be appreciated that a local-area network ("LAN"), the Internet, or any other networking topology known in the art that connects the data centers 804 to remote clients and other users may be utilized. It should also be appreciated that combinations of such networks may also be utilized. The authentication service 108 offered as a service by the service provider network 802 may manage the deployment of computing resources of the service provider network 802 when authenticating the users 102, as described herein.

Figure 9:
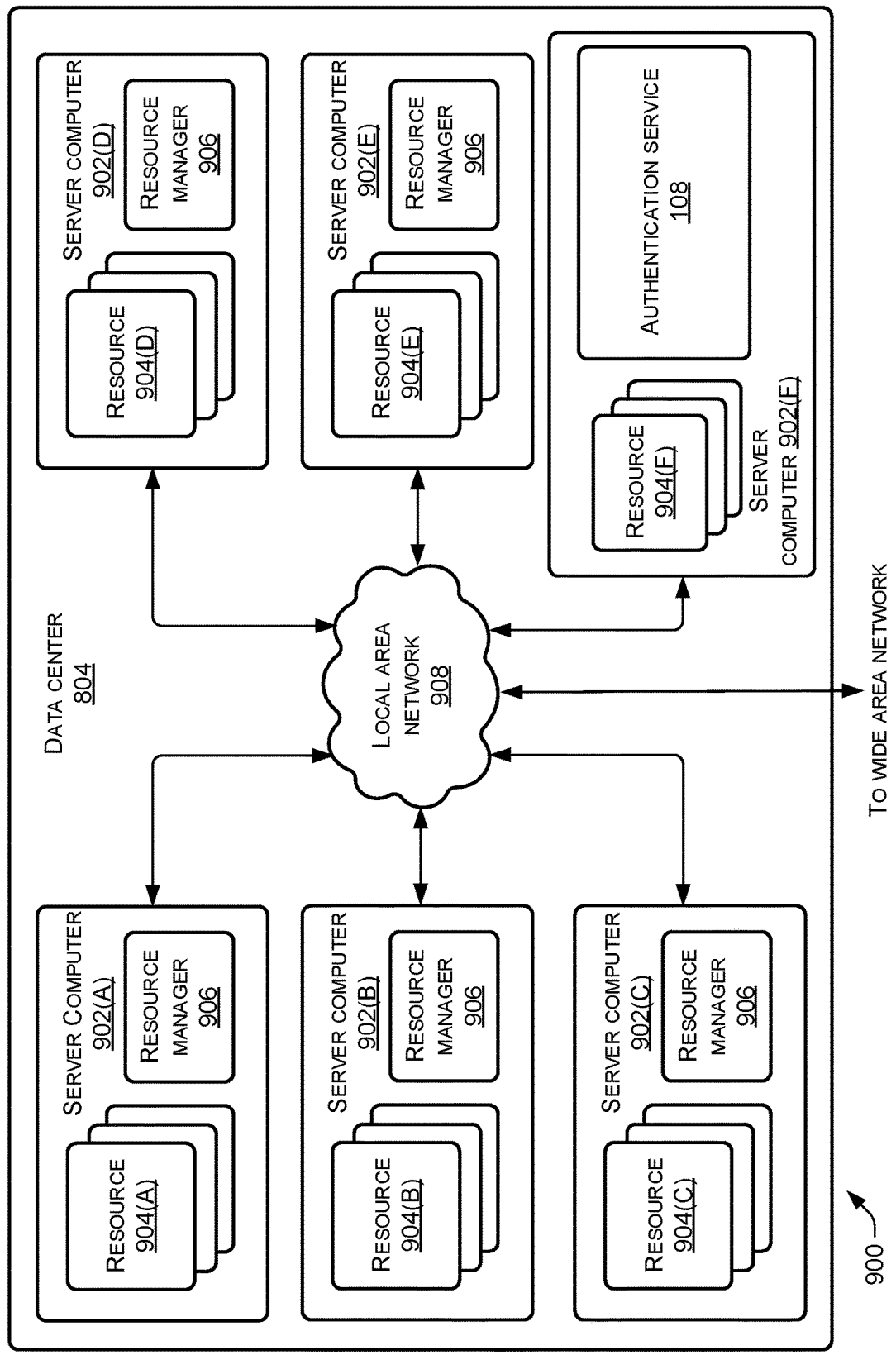
FIG. 9 illustrates an example computing system diagram showing a configuration for a data center that may be utilized to implement aspects of the technologies disclosed herein, according to an embodiment of the present disclosure.

FIG. 9 is a computing system diagram 900 that illustrates one configuration for the data center 804 that implements aspects of the technologies disclosed herein. The example data center 804 shown in FIG. 9 includes several server computers 902A-902F (which might be referred to herein singularly as "a server computer 902" or in the plural as "the server computers 902") for providing computing resources 904A-904E.

The server computers 902 may be standard tower, rackmount, or blade server computers configured appropriately for providing the computing resources described herein (illustrated in FIG. 9 as the computing resources 904A-904E). The computing resources provided by the service provider network 902 may be data processing resources such as VM instances or hardware computing systems, database clusters, computing clusters, storage clusters, data storage resources, database resources, networking resources, and others. Some of the server computers 902 may also be configured to execute a resource manager 906 capable of instantiating and/or managing the computing resources. In the case of VM instances, for example, the resource manager 906 may be a hypervisor or another type of program configured to enable the execution of multiple VM instances on a single server computer 902. Server computers 902 in the data center 804 may also be configured to provide network services and other types of services.

In the example data center 804 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between each of the data centers 804A-804N, between each of the server computers 902A-902F in each data center 804, and, potentially, between computing resources in each of the server computers 902. It should be appreciated that the configuration of the data center 804 described with reference to FIG. 9 is merely illustrative and that other implementations may be utilized.

The data center 804 shown in FIG. 9 also includes a server computer 902F that may execute some or all of the software components described above. For example, and without limitation, the server computer 902F (and the other server computers 902) may generally correspond to a server/computing device configured to execute components including, without limitation, the authentication service 108 that manages the authentication of users 102 attempting to access the network resource 104, as described herein, and/or the other software components described above. The server computer 902F may also be configured to execute other components and/or to store data for providing some or all of the functionality described herein. In this regard, it should be appreciated that the components illustrated in FIG. 9 as executing on the server computer 902F may execute on many other physical or virtual servers in the data centers 804 in various embodiments. Thus, the data center 804 in FIG. 9 may also include a plurality of server computers 902 that execute a fleet of VM instances.

Figure 10:
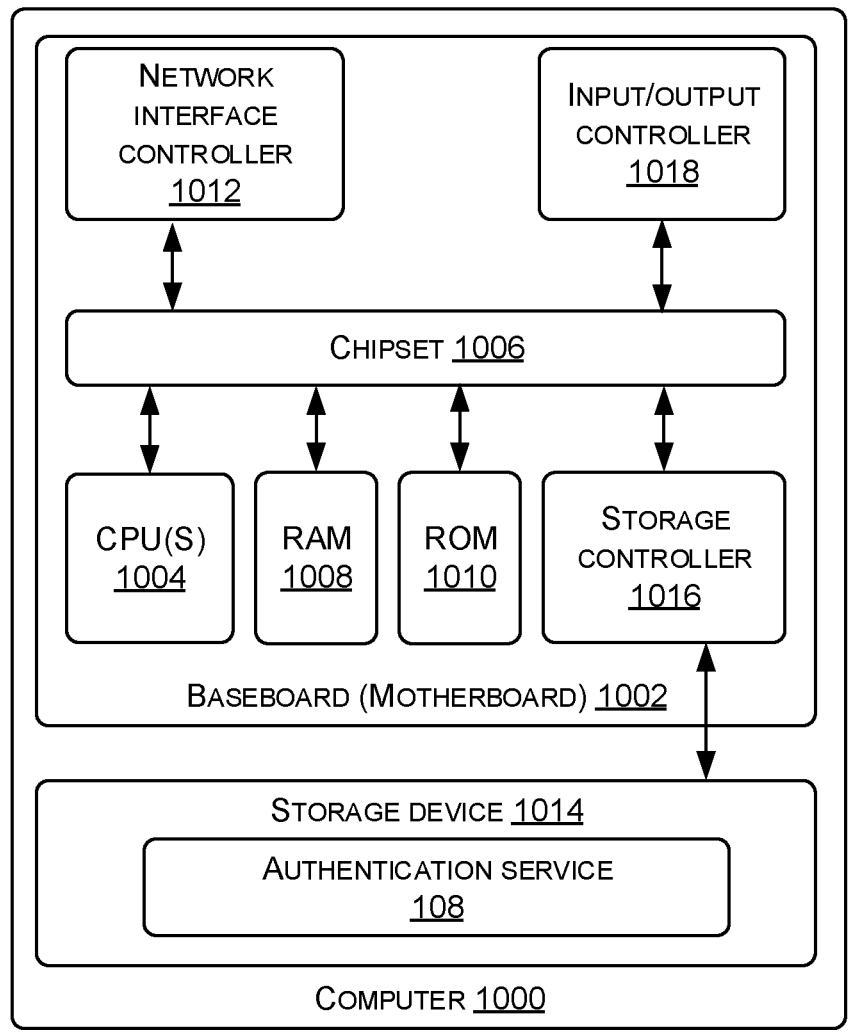
FIG. 10 illustrates an example computer architecture diagram showing an exemplary computer hardware architecture for implementing a computing device that may be utilized to implement aspects of the various technologies presented herein, according to an embodiment of the present disclosure.

FIG. 10 shows an example computer architecture for a computer 1000 capable of executing program components for implementing the functionality described above. The computer architecture shown in FIG. 10 illustrates a server computer, workstation, desktop computer, laptop, tablet, network appliance, e-reader, smartphone, or other computing device, and may be utilized to execute any of the software components presented herein. In some examples, the computer 1000 may correspond to one or more computing devices that implements the components and/or services described in FIG. 1 (e.g., the user devices 106, the authentication service 108, etc.).

The computer 1000 includes a baseboard 1002, or "motherboard," which is a printed circuit board to which a multitude of components or devices may be connected by way of a system bus or other electrical communication paths. In one illustrative configuration, one or more central processing units ("CPUs") 1004 operate in conjunction with a chipset 1006. The CPUs 1004 may be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 may provide an interface to a random-access memory (RAM) 1008, used as the main memory in the computer 1000. The chipset 1006 may further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM may also store other software components necessary for the operation of the computer 1000 in accordance with the configurations described herein.

The computer 1000 may operate in a networked environment using logical connections to remote computing devices and computer systems through a network, such as the LAN 908. The chipset 1006 may include functionality for providing network connectivity through a network interface controller (NIC) 1012, such as a gigabit Ethernet adapter. The NIC 1012 is capable of connecting the computer 1000 to other computing devices over the LAN 908 (or the network 808). It should be appreciated that multiple NICs 1012 may be present in the computer 1000, connecting the computer 100 to other types of networks and remote computer systems.

The computer 1000 may be connected to a mass storage device 1014 that provides non-volatile storage for the computer 1000. The mass storage device 1014 may store an operating system, programs, and/or components including, without limitation, the authentication service 108 that manages the authentication of users 102 before providing access to the network resource 104, as described herein, and data, which have been described in greater detail herein. The mass storage device 1014 may be connected to the computer 1000 through a storage controller 1016 connected to the chipset 1006. The mass storage device 1014 may consist of one or more physical storage units. The storage controller 1016 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 may store data on the mass storage device 1014 by transforming the physical state of the physical storage units to reflect the information being stored. The specific transformation of physical state may depend on various factors, in different embodiments of this description. Examples of such factors may include, but are not limited to, the technology used to implement the physical storage units, whether the mass storage device 1014 is characterized as primary or secondary storage, and the like.

For example, the computer 1000 may store information to the mass storage device 1014 by issuing instructions through the storage controller 1016 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1014 by detecting the physical states or characteristics of one or more particular locations within the physical storage units.

In addition to the mass storage device 1014 described above, the computer 1000 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1000. In some examples, the operations performed by the service provider network 802, and or any components and/or services included therein, may be carried out by the processor(s) 112 and/or 134.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that may be used to store the desired information in a non-transitory fashion. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof.

As mentioned briefly above, the mass storage device 1014 may store an operating system utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX operating system or one of its variants. It should be appreciated that other operating systems may also be utilized. The mass storage device 1014 may store other system or application programs and data utilized by the computer 1000.

In one embodiment, the mass storage device 1014 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 3-7. The computer 1000 may also include computer-readable storage media having instructions stored thereupon for performing any of the other computer-implemented operations described herein.

The computer 1000 may also include one or more input/output controllers 1018 for receiving and processing input from a number of input devices, such as a keyboard, a mouse, a touchpad, a touch screen, an electronic stylus, or other type of input device. Similarly, an input/output controller 1018 may provide output to a display, such as a computer monitor, a flat-panel display, a digital projector, a printer, or other type of output device. It will be appreciated that the computer 1000 might not include all of the components shown in FIG. 10, may include other components that are not explicitly shown in FIG. 10, or might utilize an architecture completely different than that shown in FIG. 10.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
one or more non-transitory computer-readable media storing computer-executable instructions that, when executed by the one or more processors, cause the one or more processors to perform acts comprising:
receiving, from a user device associated with a user, a first indication that the user is attempting to access a serverless website;
receiving, from the user device, a request for a token associated with accessing the serverless web site;
generating the token for the user;
transmitting, to the user device, the token;
receiving, from the user device, the token;
determining, at a first time, that the token is valid based on comparing the token to a token database to determine that the token is included within the token database;
receiving, from the user device, the token and an email address associated with the user;
determining, at a second time that is after the first time, that:
the token is valid; and
the user is authorized to access to the serverless website based on comparing the email address to an email address database to determine that the email address is included within the email address database;
generating a secret key for the user to access the serverless website based on determining, at the second time, that the token is valid and the user is authorized to access the serverless website;
causing the secret key to be provided to the user via the email address;
receiving, from the user device, the token, the email address, and the secret key;
determining, at a third time that is after the second time, that:
the token is valid;
the user is authorized to access the serverless website based on the email address; and
the secret key is valid based on comparing the secret key to a secret key database to determine that the secret key is included within the secret key database;
authenticating the user based on determining, at the third time, that the token is valid, the user is authorized to access the serverless website based on the email address, and the secret key is valid; and
causing access to the serverless website to be provided.

2. The system of claim 1, the acts further comprising:
determining a first expiration time associated with the token expiring; and
determining a second expiration time associated with the secret key expiring, and wherein:
determining, at the first time, that the token is valid is further based on the first time being less than the first expiration time;
determining, at the second time, that the token is valid is further based on the second time being less than the first expiration time;
determining, at the third time, that the token is valid is further based on the third time being less than the first expiration time; and
determining, at the third time, that the secret key is valid is further based on the third time being less than the second expiration time.

3. The system of claim 1, the acts further comprising:
causing, based on determining that the token is valid at the first time, a first interface to be displayed on the user device, the first interface prompting the user to input the email address; and
causing, based on determining, at the second time, that the token is valid and that the user is authorized to access the serverless website, a second interface to be displayed on the user device, the second interface prompting the user to input the secret key provided to the user via the email address.

4. The system of claim 1, the acts further comprising:
receiving, from the user device, credentials of the user that are associated with providing access to the serverless website, the credentials comprising the token, the email address, and the secret key;
determining, at a fourth time that is after the third time, that the credentials are valid based on:
the token being valid;
the user being authorized to access the serverless website; and
the secret key being valid; and
causing access to the serverless website to be provided based on determining that the credentials are valid.

5. A method comprising:
receiving, from a user device associated with a user, a token associated with the user accessing a website;
determining, at a first time, that the token is valid;
receiving, from the user device, the token and an identifier associated with the user;
determining, at a second time that is after the first time, that the token is valid and that the identifier is associated with the user authorized to access the website;
generating, based at least in part on the token being valid and the user being authorized to access the web site, a secret key associated with the user;
causing the secret key to be provided to the user;

receiving, from the user device, the token, the identifier, and the secret key;

determining, at a third time that is after the second time, that the user is authenticated based at least in part on determining that:
   the token is valid;
   the user is authorized to access the web site; and
   the secret key is valid; and
causing access to the website to be provided to the user.

6. The method of claim 5, further comprising:
receiving, from the user device, a request to generate the token; and
providing, to the user device, the token.

7. The method of claim 5, wherein:
determining, at the first time, that the token is valid comprises:
   comparing the token to a token database to determine that the token is included within the token database; and
   comparing a first time stamp associated with generation of the token to a first time threshold to determine that the token has not expired;
determining, at the second time, that the token is valid comprises:
   comparing the token to the token database to determine that the token is included within the token database; and
   comparing the first time stamp associated with the generation of the token to the first time threshold to determine that the token has not expired;
determining, at the third time, that the token is valid comprises:
   comparing the token to the token database to determine that the token is included within the token database; and
   comparing the first time stamp associated with the generation of the token to the first time threshold to determine that the token has not expired; and
determining, at the third time, that the secret key is valid comprises:
   comparing the secret key to a secret key database to determine that the secret key is included within the secret key database; and
   comparing a second time stamp associated with generation of the secret key to a second time threshold to determine that the secret key has not expired.

8. The method of claim 7, wherein:
determining, at the second time, that the user is authorized to access the website comprises comparing the identifier to an identifier database to determine that the identifier is included within the identifier database; and
determining, at the third time, that the user is authorized to access the website comprises comparing the identifier to the identifier database to determine that the identifier is included within the identifier database.

9. The method of claim 5, further comprising:
causing, based at least in part on determining that the token is valid at the first time, a first interface to be displayed on the user device, the first interface prompting the user to input the identifier; and
causing, based at least in part on determining, at the second time, that the token is valid and that the user is authorized to access the website, a second interface to be displayed on the user device, the second interface prompting the user to input the secret key provided to the user.

10. The method of claim 9, further comprising instructing, based at least in part on determining, at the third time, that the token is valid, the user is authorized to access the website, and that the secret key is valid, the user device to remove the second interface from display via the user device.

11. The method of claim 5, further comprising:
receiving, from the user device, credentials of the user that are associated with accessing the website;
determining, at a fourth time that is after the third time, that the credentials are valid; and
causing access to the website to be provided based at least in part on determining that the credentials are valid.

12. The method of claim 11, wherein the credentials comprise the token, the identifier, and the secret key.

13. The method of claim 5, further comprising causing access to the website to be denied based at least in part on at least one of:
   determining that the token is invalid;
   determining that the user is unauthorized to access the website; or
   determining that the secret key is invalid.

14. The method of claim 5, further comprising causing an indication to be displayed on a browser operating on the user device based at least in part on causing access to the website to be provided to the user, the indication indicating that the user is authenticated for accessing the website.

15. A system comprising:
one or more processors; and
one or more non-transitory computer-readable media storing computer-executable instructions that, when executed by the one or more processors, cause the one or more processors to perform acts comprising:
   receiving, from a user device at a first instance, a first token associated with a user accessing a network resource;
   determining that the first token is valid;
   causing a first interface to be presented on the user device, the first interface prompting the user to provide an identifier of the user;
   receiving, from the user device at a second instance that is after the first instance, the first token and the identifier;
   determining that the first token is valid and the user is authorized to access the network resource based on the identifier;
   generating a second token associated with the user accessing the network resource;
   sending the second token to the user device;
   causing a second interface to be presented on the user device, the second interface prompting the user to provide the second token;
   receiving, from the user device at a third instance that is after the second instance, the first token, the identifier, and the second token; and
   determining whether the user device is authenticated to access the network resource based at least in part on the first token, the identifier, and the second token.

16. The system of claim 15, the acts further comprising:
determining that the user is authenticated for accessing the network resource based at least in part on:
   the first token being valid;
   the user associated with the identifier being authorized to access the network resource; and
   the second token being valid; and causing access to the network resource to be provided to the user based at least in part on determining that the user is authenticated for accessing the network resource.

17. The system of claim 15, the acts further comprising:
determining that the user is unauthenticated for accessing the network resource based at least in part on at least one of:
   the first token being invalid;
   the user associated with the identifier being unauthorized to access the network resource; or
   the second token being invalid; and
causing access to the network resource to be denied to the user based at least in part on determining that the user device is not authenticated for accessing the network resource.

18. The system of claim 15, wherein:
determining that the first token is valid comprises comparing the first token to a first token database to determine that the first token is included within the first token database;
determining that the identifier is valid comprises comparing the identifier to an identifier database to determine that the identifier is included within the identifier database; and
determining that the second token is valid comprises comparing the second token to a second token database to determine that the second token is included within the second token database.

19. The system of claim 15, the acts further comprising:
receiving, from the user device, a request to generate the first token; and
providing, to the user device, the first token.

20. The system of claim 15, wherein determining whether the user device is authenticated to access the network resource is based at least in part on the first token, the identifier, and the second token being received within a threshold amount of time from generating the second token.

* * * * *

UNITED STATES PATENT AND TRADEMARK OFFICE
CERTIFICATE OF CORRECTION

PATENT NO. : 11,405,379 B1
APPLICATION NO. : 16/802006
DATED : August 2, 2022
INVENTOR(S) : Bryan Clauss et al.

It is certified that error appears in the above-identified patent and that said Letters Patent is hereby corrected as shown below:

In the Claims

Column 29, Line 43, Claim 1, change "web site" to -- website --.

Column 30, Line 65, Claim 5, change "web site" to -- website --.

Column 31, Line 7, Claim 5, change "web site" to -- website --.

Signed and Sealed this
Twenty-fifth Day of October, 2022

*Katherine Kelly Vidal*

Katherine Kelly Vidal
*Director of the United States Patent and Trademark Office*